United States Patent [19]
Wallace

[11] Patent Number: 5,354,245
[45] Date of Patent: Oct. 11, 1994

[54] CONTINUOUSLY VARIABLE SPEED PLANETARY GEAR APPARATUS

[75] Inventor: Henry W. Wallace, Bradenton, Fla.

[73] Assignee: Wallace Associated Research, Lakewood, Colo.

[21] Appl. No.: 89,242

[22] Filed: Jul. 9, 1993

Related U.S. Application Data

[62] Division of Ser. No. 962,404, Oct. 16, 1992, Pat. No. 5,273,497.

[51] Int. Cl.⁵ .............................................. F16H 37/08
[52] U.S. Cl. ....................................... 475/207; 74/417
[58] Field of Search .................... 475/331, 162, 207; 74/665 F, 665 GB, 665 GC, 416, 417

[56] References Cited

U.S. PATENT DOCUMENTS

| | | | |
|---|---|---|---|
| 974,961 | 11/1910 | Hall | 74/393 |
| 2,149,785 | 3/1939 | Neugebauer et al. | 60/13 |
| 2,659,248 | 11/1953 | Kenyon | 475/207 |
| 2,924,125 | 2/1960 | Brandon | 475/230 |
| 3,357,272 | 12/1967 | Roberts | 475/220 |
| 3,410,155 | 11/1968 | Polzin et al. | 475/269 |
| 3,429,394 | 2/1969 | Jacono | 475/207 |
| 3,439,561 | 4/1969 | Preston | 475/221 |
| 4,434,681 | 3/1984 | Friedrich et al. | 475/82 |
| 4,597,312 | 7/1986 | Hicks et al. | 475/230 |
| 4,796,412 | 1/1989 | O'Neill | 74/665 GB X |
| 4,856,370 | 8/1989 | Stidworthy | 475/221 |
| 5,129,275 | 7/1992 | Park | 74/417 |
| 5,207,119 | 5/1993 | Garneau | 475/331 X |
| 5,232,413 | 8/1993 | Pratolongo | 475/162 X |

Primary Examiner—Dirk Wright
Assistant Examiner—Khoi Q. Ta
Attorney, Agent, or Firm—Sheridan Ross & McIntosh

[57] ABSTRACT

A transmission (26) of continuously-engaged gear teeth of standard gear design is provided for infinitely or steplessly varying the ratio of output angular velocity to torque across a range which can include zero output angular velocity. In one embodiment, the transmission comprises a planetary gear assembly including planetary gear (28), intermediary gear (30) and sun gear (32). The transmission ratio of the transmission (26) is varied by changing the orientation of the planetary gear (28) relative to the orbital plane thereof. The gears can remain continuously engaged as the transmission ratio is varied for more efficiently matching the power source torque and angular velocity properties to those of a load, as well as reducing or substantially eliminating the need for a clutch mechanism. Novel mechanisms are provided for varying the orientation of the planetary gear (28) and for interconnecting the planetary shaft (110) to the orbital shaft (62).

10 Claims, 8 Drawing Sheets

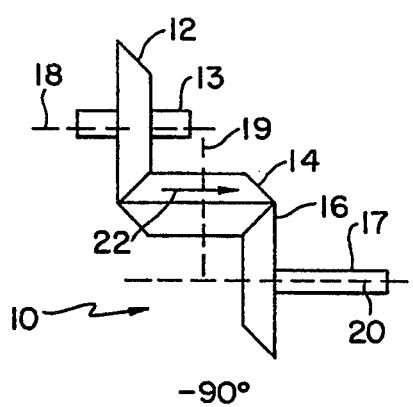
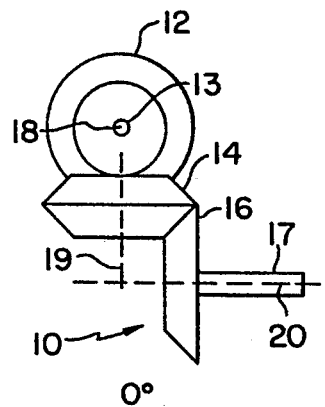
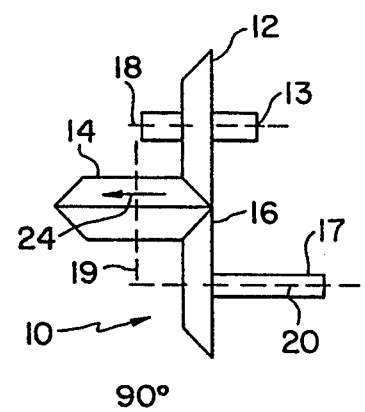
-90°　　　　　　　0°　　　　　　　90°
FIG.1a　　　FIG.1b　　　FIG.1c
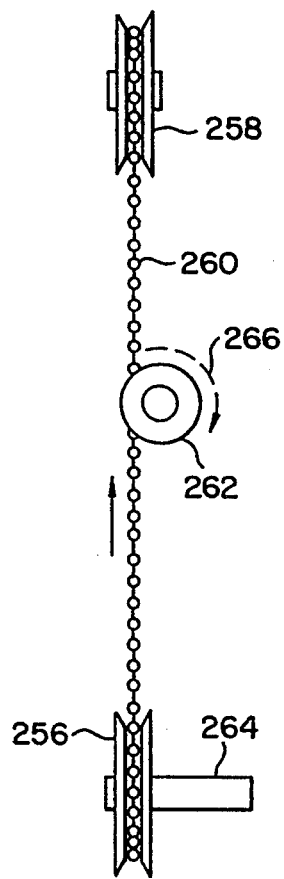
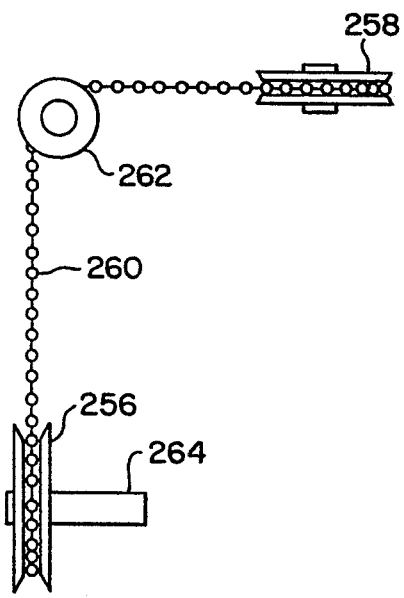
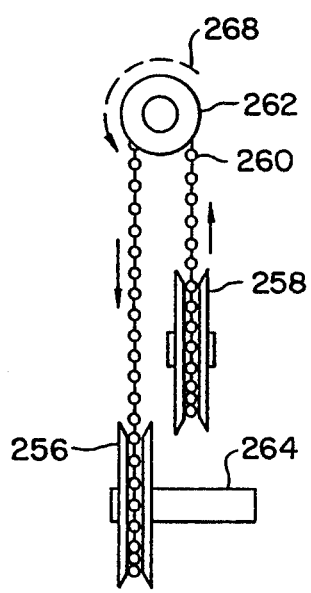
FIG.4a　FIG.4b　　　　　　FIG.4c

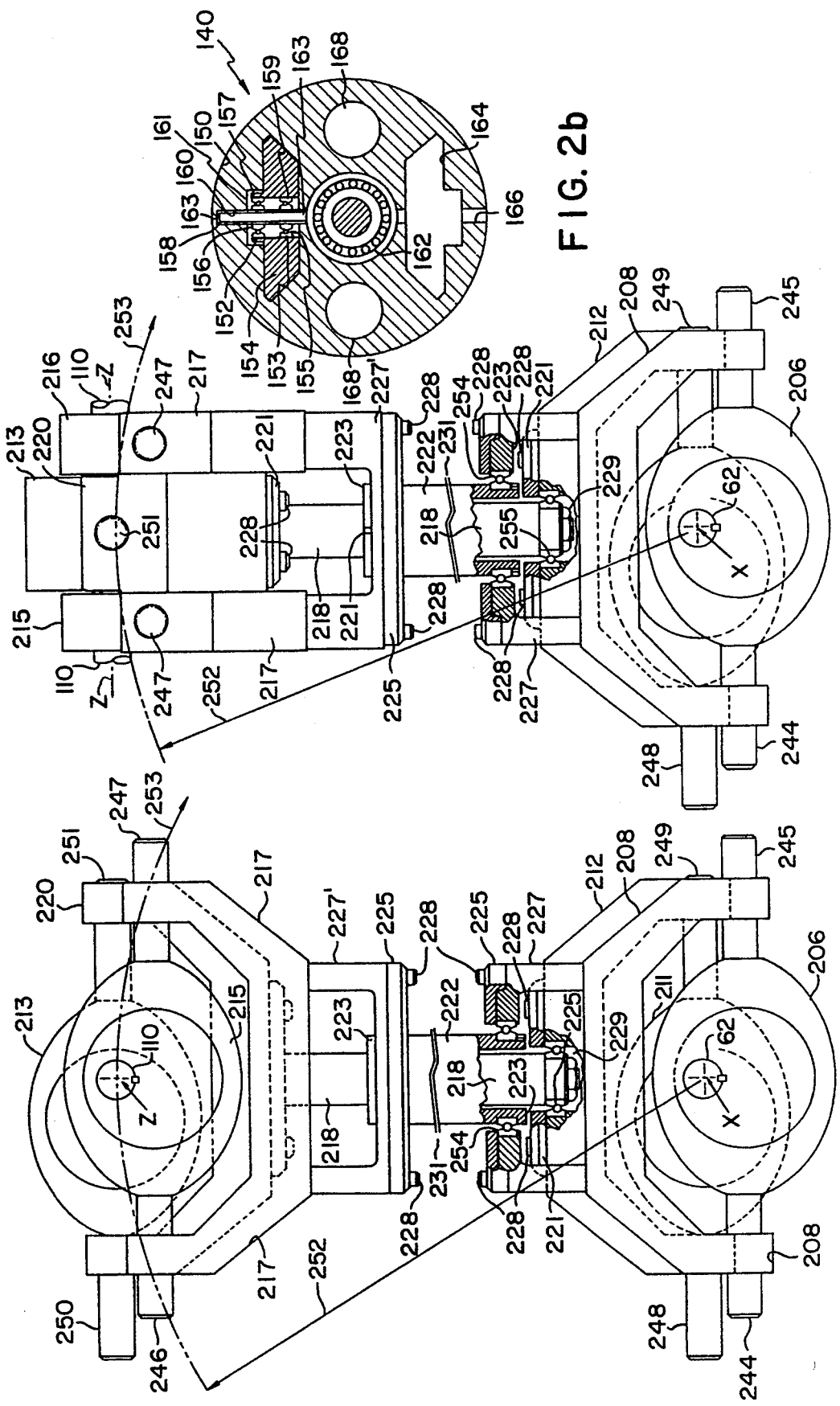

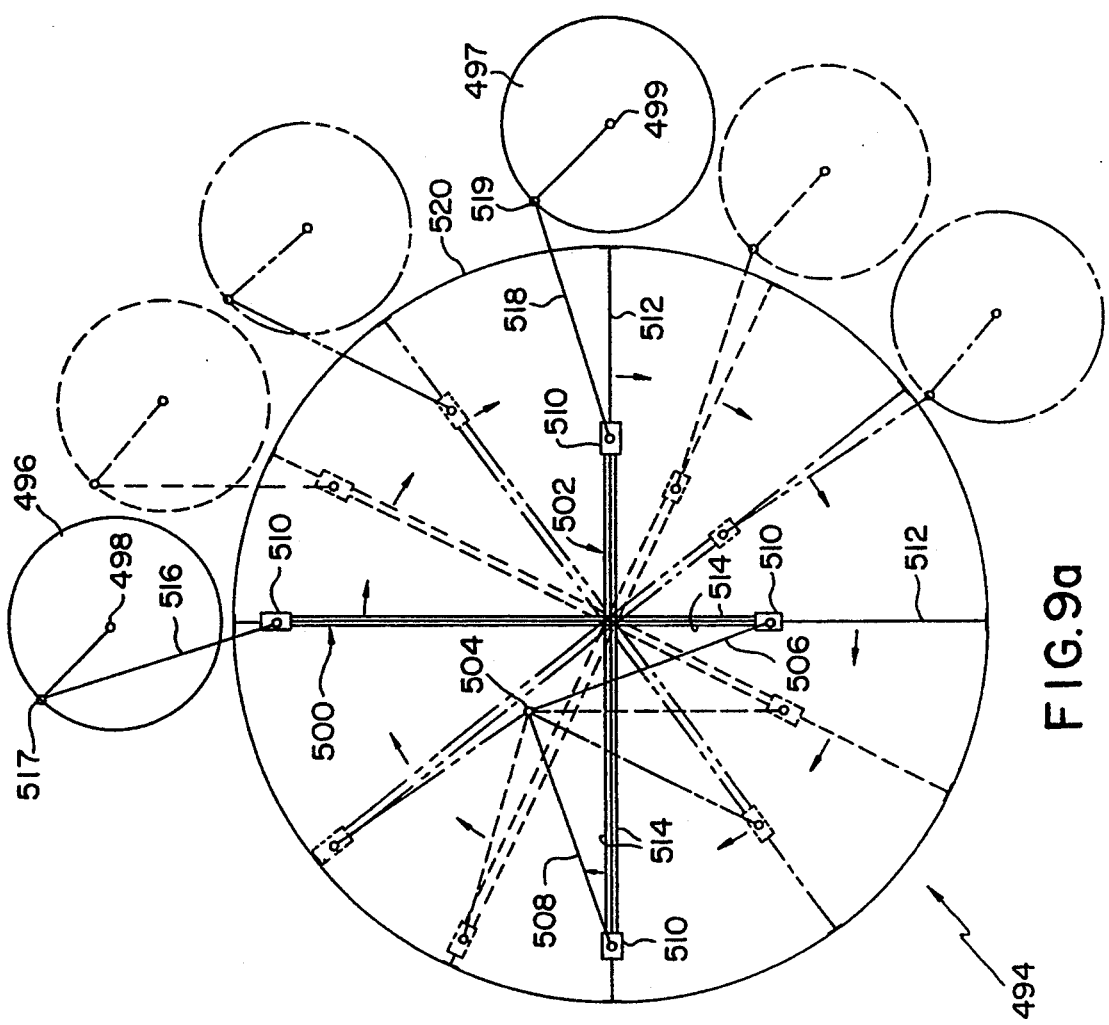
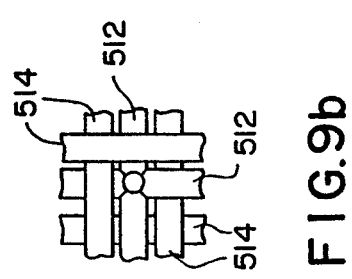

5,354,245

CONTINUOUSLY VARIABLE SPEED PLANETARY GEAR APPARATUS

This is a divisional of application Ser. No. 07/962,404, filed Oct. 16, 1992, now U.S. Pat. No. 5,273,497.

FIELD OF THE INVENTION

The present invention relates generally to mechanical transmissions, but more particularly, to a transmission for infinitely varying the ratio of the output shaft angular velocity to the input shaft angular velocity within a range which can span from negative, or reverse, angular velocities, through zero angular velocity, and into positive, or forward, angular velocities as the input angular velocity remains constant in value; it is based on a discovery within the field of physics in the area of mechanics.

BACKGROUND OF THE INVENTION

Transmissions are used to vary the ratio of output torque to output angular velocity in systems which transmit power by exerting the product of torque and angular velocity. Typically, a transmission is employed in the drive train of a machine and has an input shaft which is selectively coupled to a drive source and an output shaft which is coupled to a driven source whereby the output of the drive source is utilized to do work. The power output of a typical drive source, e.g., an internal combustion engine, generally increases with the speed of operation of the drive source as reflected by an increasing torque and rate of rotation of the input shaft. The rate of rotation of the output shaft generally determines the speed of operation or output angular velocity of the machine. Thus, the ratio of torque to angular velocity is changed by varying the transmission ratio of the transmission, i.e., the ratio of the output rate of rotation to the input rate of rotation. Transmissions are therefore utilized to approximately match, within the constraints of the transmission and drive source, the delivered energy to existing operating conditions, including the load on the output shaft and machine operating speed.

The case of a common automotive transmission is illustrative. The transmission input shaft is coupled to the automobile engine and the output shaft is coupled to the drive wheels of the automobile. Automobile transmissions are often capable of providing several discrete transmission ratios which are selectively employed to suit driving conditions. For example, in some cases, such as accelerating from a stop or climbing a hill, a relatively large torque-to-angular-velocity ratio is required and a low transmission ratio can be utilized. Conversely, as the automobile speed increases, a smaller torque-to-angular-velocity ratio may be necessary and a higher transmission ratio can be selected. In this regard, many modern automobiles include an overdrive transmission ratio, i.e., a ratio greater than unity or thereabouts such that the output shaft rotates faster than the input shaft. Such a transmission ratio can be employed, for example, in constant speed highway driving conditions wherein the overdrive ratio allows delivery of sufficient torque to maintain constant automobile speed while allowing the engine speed to be reduced relative to one-to-one drive, thereby saving fuel and reducing engine wear.

In some conventional transmissions, the transmission ratio is varied by disengaging a first set of torque wheels and engaging a second set of torque wheels. As used herein, the term "torque wheel" includes gears, sprocket wheels, pulleys and other rotatable members utilized to transmit power by exerting torque and angular velocity. Appropriate linkage, e.g., gear teeth, belts, chains, or fluid couplings are provided to link torque wheels so that torque is transmitted therebetween when the torque wheels are engaged. As between torque wheels, speed reduction generally means torque increase. The torque transmitted from a driving torque wheel to a driven torque wheel is therefore dependent upon the relative rates of rotation of the wheels when engaged which, in turn, depends on the torque wheel ratio of the wheels, e.g., the relative number of gear teeth, sprocket teeth or pitch diameters, of the wheels. Thus, changing the transmission ratio in conventional transmissions commonly involves disengaging a first set of torque wheels and engaging a second set of torque wheels having an overall torque wheel ratio different from that of the first set of wheels.

Relatedly, transmissions are generally used in conjunction with clutch mechanisms in the drive trains of machinery. Clutch mechanisms serve to uncouple the drive source and driven source, i.e., to allow rotational slippage therebetween. A clutch mechanism can be used to uncouple the drive source and driven source so as to allow idling and starting of the drive source without an output load thereon. It will be appreciated that such a load will be incurred when a transmission is engaged in a non-zero transmission ratio fashion. Similarly, clutch mechanisms are used to uncouple the drive source and driven source while the transmission ratio is changed by disengaging a first set of torque wheels and engaging a second set of torque wheels having an overall torque wheel ratio different from that of the first set of torque wheels.

Although various types of clutch mechanisms have been developed over the years, such mechanisms commonly entail frictional losses. By way of example, one known type of clutch mechanism utilizes a pair of opposing friction plates, one of which is associated with the drive source and the other associated with the driven source. To uncouple the drive source and driven source, the plates are operatively separated so that the plates can rotate at different rates. To couple the drive source and driven source, the plates are urged together in frictional contact so that the plates rotate in unison. Both static and dynamic frictions are involved. Such frictional coupling then results in loss of useful power and increased machinery wear.

There are a number of drawbacks or less than optimized aspects associated with transmissions such as identified above. Initially, such transmissions can achieve only a limited number of discrete transmission ratios or a narrow range of transmission ratios. Therefore, the transmission ratio of such devices can only be roughly varied to suit changing operation conditions resulting in un-optimized power utilization and/or reduced drive source efficiency. Additionally, with such transmissions it is generally necessary to use a clutch mechanism to uncouple the drive source and driven source because a transmission ratio of zero cannot be achieved when the torque wheels are engaged, e.g., when the gears are meshed. Accordingly, it would be advantageous to provide a transmission wherein the transmission ratio is infinitely or steplessly varied across a range of transmission ratios including zero, and wherein torque wheels remain continuously engaged, thereby enhancing machinery performance and efficiency, reducing machinery friction and wear, and substantially eliminating the need for a clutch mechanism.

Heretofore, transmissions have been provided wherein the effective torque wheel ratio between engaged torque wheels was variable across a limited range. For example, belt and pulley type transmissions have been constructed wherein the torque wheel ratio between two pulleys could be varied by causing the belt to ride higher or lower within the flanges of at least one of the pulleys such that the effective radius of the pulley was changed. Thus, the transmission ratio of such a transmission could be reduced by increasing the effective radius of a pulley coupled with the transmission output or by decreasing the effective radius of a pulley coupled with the transmission input. However, it is readily apparent that such devices cannot provide a transmission ratio of zero without disengaging torque wheels as this would require an infinitely large output pulley or an input pulley having a radius of zero. Such devices may also be subject to catastrophic failure due to frictional contact between the belt and pulley flanges where again dynamic friction loss is unavoidable. Thus, it would be advantageous to provide a transmission wherein the transmission ratio can be infinitely varied without varying the torque wheel ratio of engaged torque wheels.

SUMMARY OF THE INVENTION

The present invention provides a transmission wherein the transmission ratio can be infinitely varied across a desired range of transmission ratios which range can include zero and non-zero values or can include both negative and positive values in addition to the zero value, i.e., the transmission can provide forward, reverse, and neutral drive conditions through variations of the transmission ratio. In addition, such a transmission is provided wherein the torque wheels can remain continuously engaged as the transmission ratio is infinitely varied across the range thereby substantially eliminating the need for a clutch mechanism, reducing friction relative to prior art transmissions, and matching the torque and angular velocity properties of both the power source and the load more ably so as to appreciably enhance the efficiency of the power source output and the desired performance characteristics of the load.

A transmission constructed in accordance with the present invention includes a planetary torque wheel, a sun torque wheel, and a device for operationally interconnecting the planetary and sun wheels wherein the orientation of the planetary torque wheel can be varied relative to an orbital plane thereof. The interconnecting device selectively translates orbital motion of the planetary gear into rotational motion of the sun gear. As used herein, the terms "orbit," "orbital" and the like refer to the cyclic revolution of a member about an axis external to the member whereas the terms "rotate," "rotational" and the like refer to rotary or turning motion of a member around a central axis thereof, i.e., an axis which passes within a perimeter of such member. The sun torque wheel can be directly coupled to an output shaft and the planetary torque wheel can be indirectly coupled to an input shaft of the transmission, where either the input or output shaft can be coupled to the driving source.

It will be understood from the description herein that, in a planetary torque wheel assembly, the torque and angular velocity transmission characteristics of the assembly depend both on the orbital, nonrotative movement of the planetary torque wheel(s) and on the orbital, rotative movement of the interconnecting device relative to the sun torque wheel. Thus, the resultant effect on the sun torque wheel and output shaft of a transmission constructed in accordance with the present invention can be understood as comprising the combination of the effect due to the orbiting motion of the nonrotatable planetary torque wheel(s) and the effect due to the orbital, rotative motion of the interconnecting device. The effect due to the orbital motion of the planetary wheel(s) depends on factors including the orbital cyclic rate of the nonrotatable planetary wheel(s) and the infinitely-variable angle existent between the planetary wheel's(s') axis (axes) of symmetry and the plane of the (their common) orbit. The effect due to motion of the interconnecting device may depend on such factors as the rotational rate of the device and, where the device comprises a plurality of torque wheels, the overall torque wheel ratio of the device. In accordance with the present invention, these effects can be combined in an additive, subtractive or non-interactive fashion so that the transmission can be infinitely varied across a range which can include positive and negative angular velocities, and zero, by infinitely varying the orientation of the nonrotatable planetary gear's axis of symmetry relative to the orbital plane thereof. The range of transmission ratios achievable can be changed in a number of ways including changing the torque wheel ratio between the input shaft and the planetary torque wheel to vary the ratio of input shaft rotation rate to planetary torque wheel orbital cyclic rate, providing an auxiliary torque wheel assembly between the output shaft and sun torque wheel to vary the ratio of the output shaft rotation rate to the sun torque wheel rotation rate, varying the torque wheel ratio between the planetary and sun torque wheels, varying the overall torque wheel ratio of the interconnecting device, e.g., by altering the pitch diameter ratio between two faces of a double-faced bevel gear thereof, and/or varying the ratio of the input shaft rotation rate to the planetary torque wheel rotation rate if the torque wheel rotates.

A transmission constructed in accordance with one aspect of the present invention includes an input shaft, an output shaft, and a planetary gear subassembly. The planetary gear subassembly comprises a planetary gear, a sun gear, and a device for translating orbital motion of the planetary gear into rotational motion of the sun gear. The transmission further includes a subassembly for translating rotational motion of the input shaft into orbital motion of the planetary gear. The transmission is provided with a mechanism for varying the orientation of the planetary gear's axis of symmetry relative to the orbital plane of the planetary gear thereby varying a rate of rotation of the output shaft relative to a rate of rotation of the input shaft. The device for translating orbital motion of the planetary gear into rotational motion of the sun gear preferably comprises an intermediary dual-faced gear which meshes with both the planetary gear and the sun gear, respectively.

Since a fundamental element of this invention is that of the interaction of orbital motion values with associated hardware kinematics, it becomes evident that the orbital contribution seeks to be self-canceling by a mirror-image orbital effect once the interactive effect is referenced back to the non-orbital motions. Whereas conventional planetary, or epicyclic, drives hold the sun gear fixed, or nonrotatable, the orbiting planetary gear, of necessity, must then rotate about its axis of symmetry. Two factors, in operative series, are significant components of this invention in that orbital self-canceling is overcome. Referring to the transmission described in the preceding paragraph, the first factor is the preferred feature of holding the planetary gear nonrotatable and, perforce, causing the sun gear to rotate about its axis. It has been determined that the orbiting, nonrotatable, planetary gear cannot interact with its orbit as it has no rotational vector to interact with the orbit's orbital vector. Had the sun gear been fixed in a nonrotatable state, as is conventional, the planetary's rotational vector would have been parallel to the orbit's orbital vector, these respective vectors then becoming fully additive. Also, because reference of motion is relative, the value of one orbital cycle can as readily be added to the sun gear's rotation as to the planetary's. The second factor is that of the intermediary's gear effect. Although this gear, too, is in orbit about the rotatable sun gear, its axis preferably intersects the orbital axis fixedly at 90 degrees. Thus, there is no component vector, other than zero, of the intermediary gear to interact with the orbit's orbital motion vector. Therefore, the orbiting, nonrotatable planetary gear, in kinematic series with the orbiting, dual-faced intermediary gear, transfers the orbital input to the sun gear without orbital self-cancellation.

According to a further aspect of the present invention, an apparatus is provided which holds a first shaft rotationally fixed about its longitudinal axis while allowing the first shaft to rotate about an axis transverse thereto and allowing the first shaft to orbit about an orbital axis. The apparatus comprises an interconnecting assembly including at least first and second interconnecting subassemblies. The subassemblies are eccentrically interconnected to a second shaft, which is coaxial with the orbital axis, so that each of the subassemblies reciprocates radially as the subassemblies rotate about the second shaft. As used herein, "eccentrically interconnected" refers to interconnections between first and second longitudinal members wherein relative rotational or orbital motion between the members is coupled to longitudinal reciprocating motion of the first member. For example, the subassemblies may be interconnected to the second shaft by way of crank arms, eccentric bearings or other eccentric interconnecting members. Each of the subassemblies comprises a first longitudinal member which is eccentrically interconnected to both the first shaft and to the second shaft. The reciprocating motions of the subassemblies are preferably 90° out of phase with each other. The first and second longitudinal members of each subassembly are rotatably interconnected so that the first shaft can be rotated about an axis transverse to the shaft while the first shaft orbits about the orbital axis and the first shaft remains rotationally fixed. In this regard, the first and second longitudinal members may comprise a coaxial shaft and sleeve arrangement.

According to a still further aspect of the present invention, an apparatus is provided for varying the orientation of a planetary torque wheel relative to an orbital plane of the planetary torque wheel. The apparatus comprises first and second carrier torque wheels which rotate about a common central axis thereof and carry the planetary torque wheel so that the planetary torque wheel orbits about the central axis. The apparatus further comprises a differential assembly for selectively providing an angular displacement between the first and second carrier torque wheels. In addition, the apparatus comprises an assembly for translating an angular displacement between the first and second carrier gears into a change in orientation of the planetary torque wheel.

It is an advantage of the present invention that a transmission is provided wherein the transmission ratio can be infinitely varied within a range while the torque wheels remain continuously engaged, thereby substantially eliminating the need for a clutch mechanism. It is a further advantage of the present invention that a transmission is provided wherein the transmission ratio can be infinitely varied across a range which can include zero, or across a range which includes both positive and negative values. The transmission can thereby allow selection between reverse, neutral and forward (negative, zero and positive) transmission ratios without the need for a clutch mechanism. Because the present invention reduces or substantially eliminates the need for a clutch mechanism, frictional losses are reduced in comparison to prior art transmissions.

It is a further, novel advantage of the present transmission that a transmission is provided wherein the transmission ratio can be permanently fixed at any desired ratio unlike gear boxes (due to the digital nature of the pitch diameters of, e.g., engaged gear teeth) and unlike friction drives where ratio drifting occurs due to frictional wear.

BRIEF DESCRIPTION OF THE DRAWINGS

FIG. 1a is a front view of an apparatus constructed in accordance with an embodiment of the present invention in a −90° configuration;

FIG. 1b is a front view of the apparatus of FIG. 1a in a 0° configuration;

FIG. 1c is a front view of the apparatus of FIG. 1a in a 90° configuration;

FIG. 2b is a side cross sectional view of a multi-gear housing assembly constructed in accordance with the present invention;

FIG. 2c is a side view, partially cut out, of a yoke assembly constructed in accordance with the present invention;

FIG. 2d is a side view, partially cut out, of the FIG. 2c yoke assembly in which a 90° rotation of the outer (or upper) yoke subassembly has taken place;

FIG. 4a is a front view of a planetary torque wheel assembly constructed in accordance with an embodiment of the present invention in a first configuration;

FIG. 4b is a front view of the assembly of FIG. 4a in a second configuration;

FIG. 4c is a front view of the assembly of FIG. 4a in a third configuration;

FIG. 6b is a side view of the assembly of FIG. 6a;

FIG. 7a is a front view, partially cut away, of an apparatus constructed in accordance with the present invention;

FIG. 7b is a side view of the apparatus of FIG. 7a.

FIG. 9a is a side view of a mechanism for holding planetary gears nonrotatable as they orbit in accordance with the present invention; and FIG. 9b is a front view of a portion of the mechanism of FIG. 9a.

DETAILED DESCRIPTION OF THE INVENTION

Figure 2A:
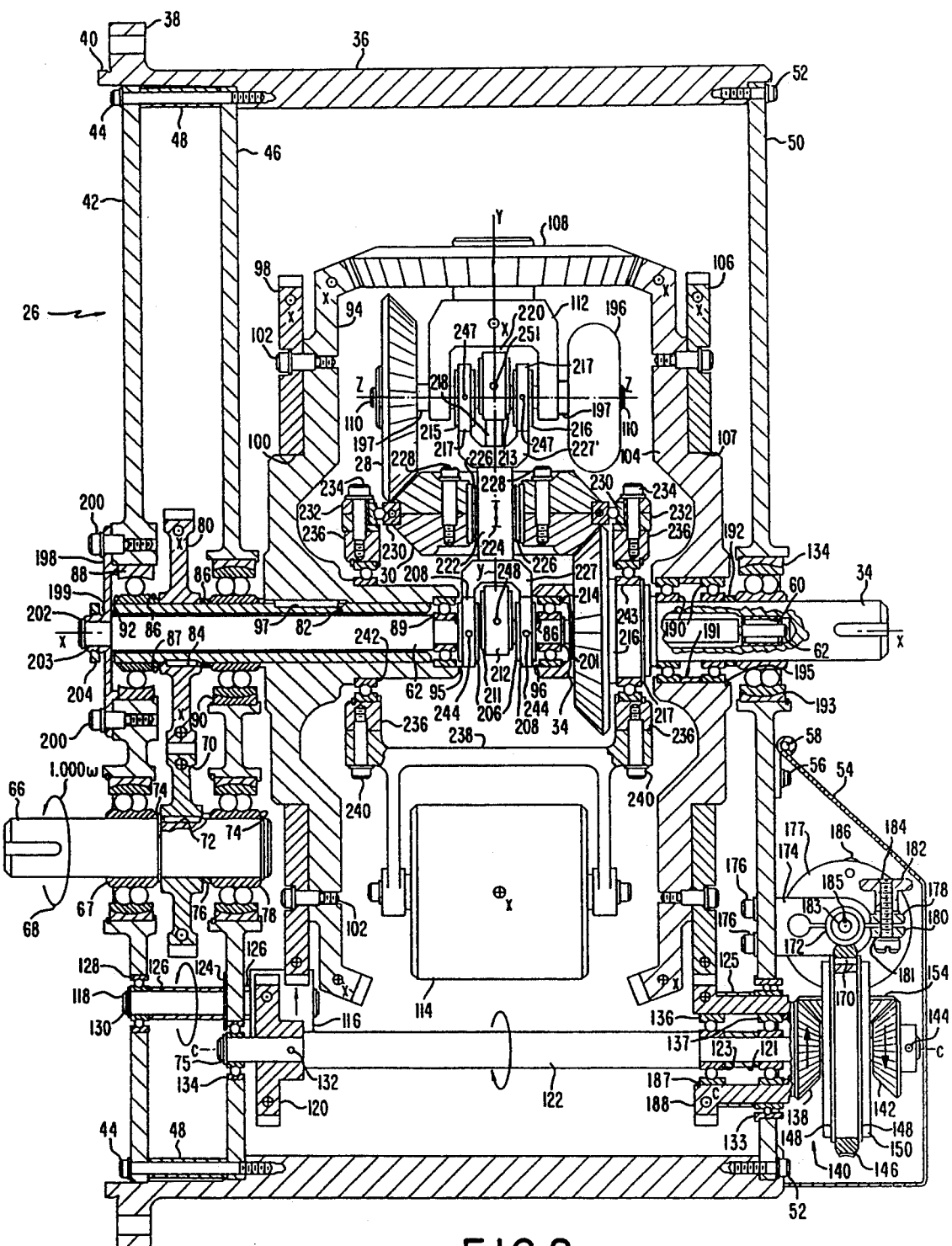
FIG. 2a is a front, partial cross-sectional view of a transmission constructed in accordance with an embodiment of the present invention in a −90° configuration.

Referring to FIGS. 1a-1c, an apparatus constructed in accordance with an embodiment of the present invention is generally identified by the reference numeral 10. The apparatus 10 comprises a meshed planetary gear assembly including planetary bevel gear 12, intermediary dual-faced bevel gear 14 and sun bevel gear 16. The apparatus will initially be described in connection with the case wherein the planetary gear 12 and sun gear 16 have identical pitch diameters and numbers of teeth. Although the apparatus 10 as shown employs a bevel gear assembly, upon consideration of the description below, one skilled in the art will understand that the apparatus may employ helical gear, chain and sprocket, belt and pulley and/or other torque wheel assemblies.

The sun gear 16 is mounted on output shaft 17 so that the sun gear 16 and output shaft 17 rotate about sun axis 20. Planetary gear 12 is mounted on planetary shaft 13 which is preferably constrained, as will be understood from the description that follows, such that the planetary gear 12 cannot rotate about planetary axis 18. However, planetary gear 12 and planetary axis 18 orbit as a link about sun axis 20. Intermediary gear 14 also orbits about sun axis 20 in order to remain meshed with planetary gear 12 and sun gear 16.

FIGS. 1a-1c depict the apparatus 10 in three different configurations. These configurations may be conveniently labeled by reference to the angular orientations of the nonrotatable central planetary axis 18 of planetary gear 12 relative to the intermediary axis 19 of intermediary gear 14 which orbits about central sun axis 20 of the sun gear 16. Thus, FIG. 1a is labeled −90°, FIG. 1b is labeled 0° and FIG. 1c is labeled 90°. Alternatively, the figures could be labeled by reference to the orientation of the central planetary axis 18 of planetary gear 12 relative to the orbital plane defined by the orbit of the planetary gear 12 about the sun axis 20 resulting in the same angular labels. It will be understood that the orbital plane of the planetary gear 12, as defined by the orbital motion of the planetary gear 12 about axis 20, will be perpendicular to axis 20. Although such an orbital plane will experience an ever-changing angle with respect to the nonrotatable axis 18 of the planetary gear 12, as the orientation of gear 12 and its axis 18 are changed from the orientation of FIG. 1a to the orientation of FIG. 1c, the orbital plane remains perpendicular to axis 20 thereby providing a suitable reference by which to identify the angular orientation of gear 12.

In accordance with the present invention, the ratio of the orbital cyclic rate of planetary gear 12 about sun axis 20 to the rate of rotation of sun gear 16 about sun axis 20 is varied by altering the angular orientation of planetary axis 18 relative to intermediary axis 19 and, in turn, relative to sun axis 20. In each of the FIGS. 1a-1c, although the planetary gear 12 can cyclically orbit about axis 20 with either of the two possible senses of revolution, the sense of orbital motion of planetary gear 12 will be taken to be such that planetary gear 12 moves out of the plane of the paper towards the observer for the purposes of this description. That is, if the apparatus 10 were viewed from the right side such that the observer was looking longitudinally along the output shaft 17 towards sun gear 16, planetary gear 12 would be observed to orbit in a counter-clockwise direction about sun axis 20.

Referring first to FIG. 1a, as planetary gear 12 orbits about sun axis 20 at a rate of 1ω as described above, with the planetary shaft 13 constrained not to rotate, the intermediary gear 14 rotates about intermediary axis 19 as indicated by arrow 22. The rotation 22 of intermediary gear 14 allows intermediary gear 14 to peripherally track about sun gear 16 at a rotational rate and sense such that, in combination with its orbital cyclic rate and orbital sense, the sun gear 16 and its output shaft 17 are locked into a nonrotating state about axis 20. That is, the effect of the orbital motion of planetary gear 12 on the intermediary gear 14 combined with the resulting effect of the orbital motion of the intermediary gear 14 in conjunction with the effect of rotation 22, also of the intermediary gear 14 on sun gear 16, are subtractive. Thus, in FIG. 1a, an orbital rate of the planetary gear 12 of 1ω results in a rate of rotation of 0ω of output shaft 17.

Referring to FIG. 1b, orbital cycling of planetary gear 12 does not result in rotation of intermediary gear 14 as this latter gear 14, too, continues its orbital cycling in unison with gear 12 in the 0° configuration as shown. Consequently, intermediary gear 14 continues its peripheral tracking about sun gear 16, its teeth engaged with opposing teeth of gear 16 such that the opposing meshed teeth of planetary gear 12 (engaged with those of intermediary gear 14, respectively) are locked while the other meshed teeth of gear 14 are respectively interlocked with those opposing teeth of sun gear 16, this pattern or state of rotatively-locked gears causing sun gear 16 to rotate as planetary gear 12 and intermediary gear 14 orbit thereabout. Thus, an orbital cyclic rate of the planetary gear 12 of 1ω results in a rate of rotation of 1ω of output shaft 17.

Referring to FIG. 1c, in the 90° configuration, orbital motion of planetary gear 12 results in rotation of the intermediary gear 14 as indicated by arrow 24. An orbital cyclic rate of planetary gear 12 of 1ω therefore results in a rate of rotation of output shaft 17 of 2ω as the effects of the orbital motions of the nonrotatable planetary gear 12 and the rotatable intermediary gear 14 becomes additive with respect to the sun gear 16 and the output shaft 17.

Thus, for a continuous input orbital cyclic rate of 1ω of planetary gear 12, the rotation rate of output shaft 17 can be infinitely varied from 0ω to 2ω by varying the angular orientation of the axis 18 of planetary gear 12 about axis 19 relative to the orbital plane of the planetary gear 12. Although only three particular orientations have been shown for the purposes of this description, it is to be understood that an infinite number of intermediate orientations between −90° and 90° may be utilized to achieve corresponding infinite numbers of intermediate output shaft 17 rotation rates. Further, although the apparatus 10 has been described with respect to an embodiment wherein planetary gear 12 and sun gear 16 have an identical number of teeth, the gear ratio of the number of teeth of planetary gear 12 to the number of teeth of sun gear 16 may be varied thereby changing the range of output rotation rates achievable for a given input orbital rate. For example, it is anticipated that by selection of a planetary gear 12 and a sun gear 16 having an appropriate gear ratio, an output rotation rate range of $-0.4\omega$ to $1.6\omega$ (rather than the range of $0\omega-2\omega$ of the embodiment described above) can be achieved for an input orbital rate of $1\omega$, where the negative sign denotes an output rotation in the opposite direction of the input orbit. Such an embodiment has the advantage that, for a continuous input orbital rate of $1\omega$, a forward, reverse, or neutral output rotation can be achieved while the gears 12, 14, and 16 remain continually enmeshed, thereby substantially eliminating the need for a clutch mechanism among other advantages.

Figure 3:
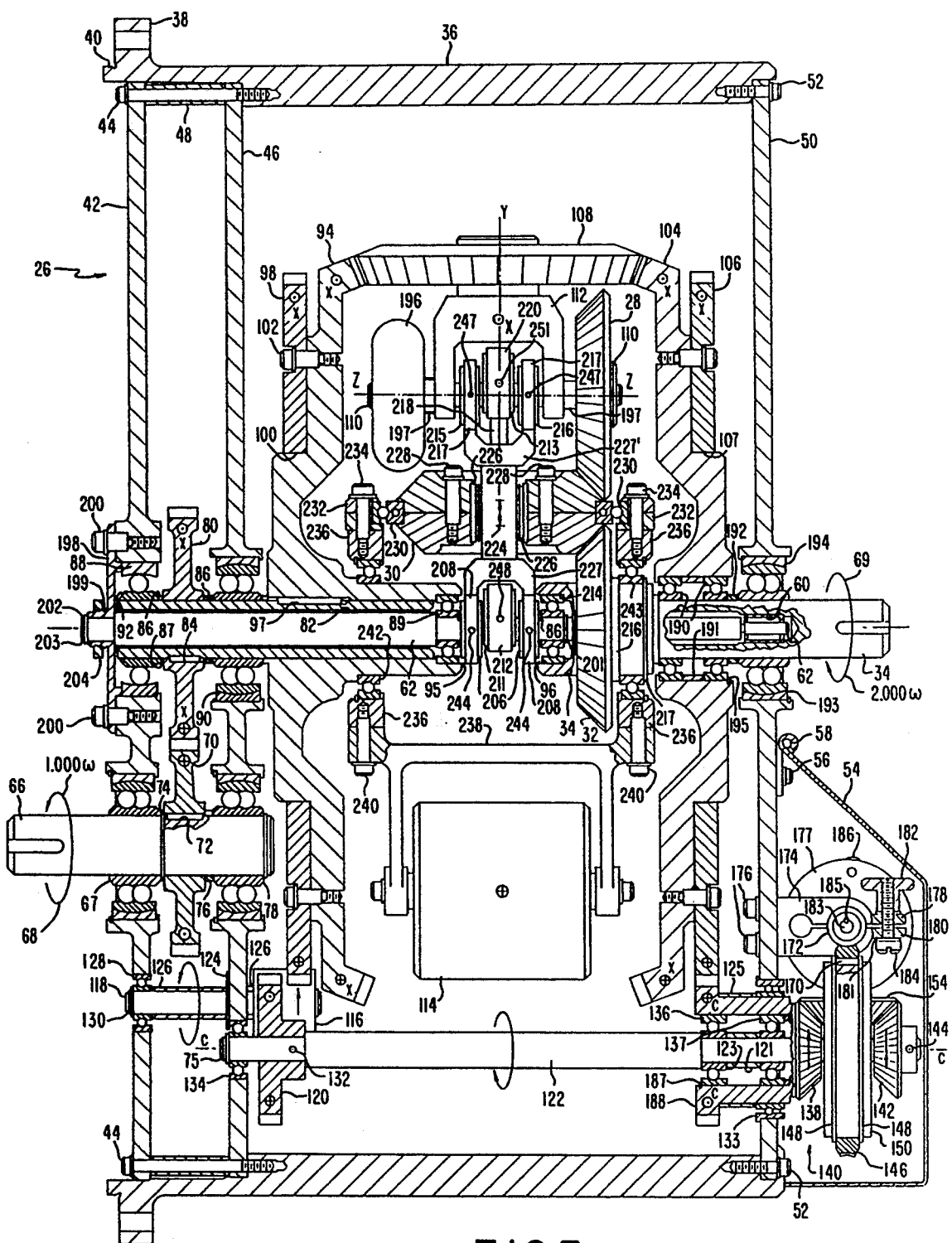
FIG. 3 is a front, partial cross-sectional view of the transmission of FIG. 2a in a 90° configuration.

Referring to FIGS. 2a and 3, a transmission incorporating a planetary gear assembly such as described in connection with FIGS. 1a–1c is generally identified by the reference numeral 26. The planetary gear assembly comprises a planetary bevel gear 28, an intermediary dual-faced bevel gear 30, and a sun gear 32 mounted on output shaft 34. The transmission is shown in a $-90°$ configuration (FIG. 2a) and a $90°$ configuration (FIG. 3) corresponding to FIGS. 1a and 1c respectively.

The transmission 26 is housed within a cylindrical housing 36 which may be formed, for example, of an aluminum alloy. The housing 36 may include a mounting flange 38 and alignment shoulder 40 for joining with further machine components. Housing 36 is circumferentially fastened to input bearing plate 42 by a plurality of appropriate, preferably evenly-spaced, fasteners 44 which can comprise socket head screws and split lock washers. In the illustrated embodiment, because the fasteners 44 also fasten inner bearing plate 46 to housing 36, stand-off sleeves 48 are provided to assure parallelism between plates 42 and 46. Similarly, output bearing plate 50 is fastened to housing 36 by a plurality of fasteners 52 which can comprise socket head screws and split lock washers. The housing 36 and plates 42, 46 and 50 thereby protect the transmission against contamination, e.g., by dirt or dust, and ensure proper relative positioning of the transmission and various shafts therein as will be described below.

Relatedly, hinged access housing 54 is hingedly fastened to bearing plate 50 by a hinge assembly including fastener 56 and hinge 58. Housing 54 may be opened to allow access to an actuating assembly for varying the orientation of planetary gear 28 as will be described below. In the closed position as shown, the housing 54 protects the actuating assembly against contamination. Housing 54 may simply be maintained in the closed position by operation by gravity, or a biasing or latching assembly may be provided for this purpose.

In the following description, reference will be made to a number of bearings. In each case, the type of bearing employed will depend on a number of factors as will be understood by those skilled in the art. These factors include space limitations, the types of gears employed, operational speeds, load factors, e.g., whether radial, axial or a combination thereof, and sensitivity to misalignment. For example, a needle roller bearing 60 is provided between orbital shaft 62 and coaxial output shaft 34 to ensure the integrity of axis x—x while allowing different rates of simultaneous angular velocity therearound. Such a bearing was selected on the basis of the minimal space requirements, high operational speeds, high-load capacity and low friction. Similarly, in each case below, the particular bearing selected will depend on the particular application. However, although particular types of bearings are specified below, it is to be understood that alternate types of bearings will be suggested to those skilled in the art.

According to the present invention, rotation of input shaft 66, which is positioned by self-aligning double row bearing 67, is translated into orbital motion of planetary gear 28 about axis x—x. As input shaft 66, i.e., at $1.000\omega$ rotates in the direction indicated by arrow 68, input shaft gear 70 which is mounted thereon rotates in the same direction, as indicated by the symbols $\oplus$ and where $\oplus$ indicates movement into the plane of the drawing away from the observer and     indicates movement out of the plane towards the observer. When applied to the drawings of FIGS. 2a, 3 and 8, the subscript letters, to the lower right of these symbols, designate to which of the possible axes the associated text is referring. In this regard, key 72 is provided to rotationally lock gear 70 to shaft 66. Gear 70 is axially positioned by external retaining rings 74, which are fitted into annular grooves in shaft 66, in cooperation with spacer 76 and self-aligning, double-row bearing 78. Gear 70 engages orbital shaft gear 80, which is rotationally interlocked to torque sleeve 82 by key 84, by way of their respective intermeshed teeth, thus causing orbital shaft gear 80 and torque sleeve 82 to rotate about axis x—x in a direction opposite to the rotation of input shaft gear 70. Orbital shaft gear 80 is axially positioned by the two spacers 86, 86 in conjunction with self-aligning bearing 88, double self-aligning bearing 90, ball bearing 89, external retaining ring 92, internal retaining ring 95, and torque sleeve bevel gear 94. Although the directional arrow 68 might be arranged to signify either clockwise or counterclockwise directions of the input shaft 66, the output shaft 34 will remain stationary in accord with the kinematics of this invention.

Torque sleeve bevel gear 94 is rotationally locked to torque sleeve 82 by way of key 97 and therefore rotates in unison with orbital shaft gear 80 in a direction opposite to the rotation of input shaft 66. Annular spur gear 98, which is concentrically positioned on bevel gear 94 by way of hub portion 100, is attached to bevel gear 94 by a plurality of ring-spaced fasteners 102 such that gears 94 and 98 form a single cluster gear. A similar, concentrically-mounted cluster gear—by means of hub portion 107—comprising bevel gear 104 and annular spur gear 106, is provided in a mirror image relationship to cluster gear 94, 98 such that crown gear 108 is respectively engaged therebetween. As will be understood from the description following, cluster gears 94, 98 and 104, 106 are operationally interconnected such that they will rotate in unison except for when it is desired to change the orientation of planetary gear 28 about its radial axis, e.g., axis 19 in FIGS. 1a, 1b, 1c. Thus, in constant transmission ratio operation, crown gear 108 will be carried by cluster gears 94, 98 and 104, 106 so that the crown gear orbits about axis x—x without rotating about axis y—y which is identified as axis 19 in earlier description. Crown gear 108 in turn carries planetary gear 28, which is mounted on planetary shaft 110 which is concentric with axis z—z by way of yoke 112 so that planetary gear 28 orbits about axis x—x without necessarily rotating about axis y—y.

In operation, rotational motion of input shaft 66 is translated into orbital motion of planetary gear 28 as follows. Rotation of input shaft 66 results in rotation of input shaft gear 70 which is mounted thereon. Input shaft gear 70 meshes with orbital shaft gear 80 which is rotationally fixed with respect to torque sleeve 82 and, in turn, cluster gear 94, 98. Cluster gear 94, 98 in conjunction with cluster gear 104, 106 drivingly carries crown gear 108, causing gear 108 to orbit about axis x—x. That cluster gear 104, 106 rotates about axis x—x with an angular velocity and rotational sense identical to that of cluster gear 94, 98—as the ratio existent between the input shaft 66 and the output shaft 34 is constant—will be explained in due order. Finally, crown gear 108 carries planetary gear 28 by means of yoke 112 so that the planetary gear 28 orbits about axis x—x as a result of rotation of input shaft 66. A counterweight 114 is provided diametrically opposite planetary gear 28, and associated assemblies for balance. For example, the overall torque wheel ratio between gear 94 and input shaft 66 can be 1:1 such that an input shaft 66 rotation rate of $1\omega$ results in an orbital rate of $1\omega$ of planetary gear 28. However, this torque wheel ratio is capable of being varied due to the inverse function provided by the cooperative property of the spur gear pair's respective pitch diameters, thus providing further accommodation between a power source and its load.

According to the illustrated embodiment of the present invention, the orientation of planetary gear 28 can be varied, e.g., from the $-90°$ configuration of FIG. 2a to the $90°$ configuration of FIG. 3, by angularly moving cluster gear 94, 98 relative to cluster gear 104, 106 rotatingly about axis x—x thereby initiating a phase change between the cluster gears which causes the rotating of crown gear 108 about axis y—y which in turn rotates axis z—z about axis y—y as axis z—z is carried by yoke 112. Annular spur gear 98, near its lowest extremity, engages reversing pinion gear 116 by means of their respective teeth intermeshing. Pinion gear 116, which is rigidly attached to pinion shaft 118, is positioned so that it intermeshes with transaxle spur gear 120 which is rigidly mounted on transaxle 122. Pinion gear 116 and pinion shaft 118 are positioned by flange bearing 124, spacers 126, single-shield flange bearing 128 and external retaining ring 130. Similarly, transaxle gear 120 is positionally fixed on transaxle 122 by being fitted against a left shoulder thereof and further by being fastened thereto by taper pin fastener 132. Transaxle 122 is rotatably supported by bearing 134, at its left end, and by radial thrust bearing 136 and single-shield radial thrust bearing 137 at a reduced diameter right end portion thereof. Bearings 136, 137 are axially positioned with respect to one another by means of the inner race spacer 121 and inner race shim spacers 123. The reduced diameter right end portion of transaxle 122 forms a shoulder for axially positioning the inner race of bearing 136. The outer race of bearing 137 is, in part, axially positioned by an inwardly projecting shoulder of cluster gear 138, 188. The assemblage of cluster gear 138, 188, inner race spacer 121, inner race shim spacers 123, the inner race of bearing assembly 162 (FIG. 2b), with suitable shaft spacers juxtaposed either side of this inner race so as to also properly position bevel gear 142 axially along the right end portion of transaxle 122 in cooperation with the taper pin 144 mutually penetrating the hub of gear 142 and transaxle 122. The outer race of the bearing assembly is fixedly positioned within housing 150 by means of a light press fit in association with liquid bonding such as provided by Berg or Loctite. This assemblage is then secured integrally by means of the internal retaining ring 187 and the inwardly projecting shoulder of cluster gear 138, 188 in cooperation with laminated, outer-race, shim spacers 189. The reduced diameter, right-end portion of transaxle 122 then is appreciated to additionally pass through contrarotating bevel gear 138, multi-gear housing assembly 140 and bevel gear 142, the latter being fixedly attached to transaxle 122 by taper pin 144. As the input shaft rotates, i.e., at $1.000\omega$ in the direction indicated by arrow 68, the output shaft 34 rotates at $2.000\omega$ in the direction indicated by arrow 69.

Transaxle 122 is then realized to be rotatably mounted to inner bearing plate 46, at its left end, and output bearing plate 50, at its right end, the flange bearing 133 in cooperation with the inner race spacer 125 thereby securing the right end of this subassembly and the application of the external retaining ring 75 securing the left end.

Although a particular manual actuating assembly is disclosed herein for the purpose of changing the orientation of planetary gear 28, those skilled in the art will recognize that numerous equivalently functioning manual actuating assemblies could serve this purpose. Additionally, it is recognized that an automatic assembly for changing the orientation of the planetary gear 28 and, concomitantly, the transmission ratio of the transmission 26, e.g., responsive to changes in the load on or angular velocity of output shaft 34, may be advantageously employed. For example, such an assembly could include a servo-motor to change the orientation of the planetary gear 28 and the transmission ratio based on preselected parameters of performance and/or efficiency. Consequently, it is to be understood that the particular actuating assembly disclosed is provided for purposes of illustration and completeness and that other assemblies may be provided within the scope of the present invention. An example of a manually-adjusted transmission 26 concerns its replacing of, e.g., an off-the-shelf, industrial, enclosed gear drive, or its use in combination therewith, for purposes of attaining certain, desired, fixed angular velocity ratios between rotating shafts of industrial machinery. Present enclosed drives offer a sequence of step-like ratios because gear teeth are digital in nature. If no exact, sought for, ratio can be found per step, the user is often required to resort to friction drives utilizing, e.g., V-belts. The resulting dynamic friction wear constantly causes the adjusted ratio to drift unacceptably, thus calling for constant readjustment by a skilled operator. This invention permits an adjustment, which is infinite in nature, of the ratio and which entirely eliminates drift from a particular setting due to its continuous gear tooth engagement.

Assembly 140 comprises a wormwheel rim 146 constrained between a pair of external retaining rings 148, 148 mounted on housing 150. FIG. 2b shows a side cross-sectional view of assembly 140. Housing 150 is provided with cut-out 152 to permit lateral insertion of bridging bevel gear 154 and bearings 156, 153 which are retained in the positions of FIG. 2b by the outer race bearing spacer 151, the bevel gear bore inner flange 157 and the internal retaining ring 155. The bevel gear 154 is further restrained within cut-out 152 by a pair of inner race bearing spacers 159, 161. Bearing shaft 158 is then inserted through bore 160, bearing 156 and bearing 153 so that shaft 158 bottoms on bearing assembly 162 previously inserted. If axial play of shaft 158, within bore 160, is undesirable, Belleville or curved washers 163 may be inserted at either end of shaft 158. Mirror image cut-out 164 and bore 166 allow for the addition of a second bridging bevel gear, if desired, in order to increase the density of power flow. Holes 168 are provided for lightening.

With one of the external retaining rings 148 already inserted into its respective circumferential groove in the cylindrical perimeter of housing 150, the wormwheel rim 146 is slid over the perimeter until the rim contacts this retaining ring 148. The rim is then rotatively aligned to permit insertion of key 170 to rotatively lock wormwheel rim 146 to housing 150. The second external retaining ring 148 is then constricted into its respective circumferential groove in the perimeter of housing 150 so as to lock the assembly 140 together.

Referring again to FIG. 2a, wormwheel rim 146 threadably engages worm 172 which preferably has only one or two threads so that rim 146 is unable to "reverse-drive", worm 172 in addition to providing a finer ratio adjustment. Worm 172 is rotatably mounted on split hanger 174 which is fastened to plate 50 by fasteners 176 and is further attached to crank-wheel 177. Upper 178 and lower 180 clamp projections of split hanger 174 are penetrated by a clamping assembly including knurled thumb nut 182 which threadably engages fastener 184. Fastener 184 threadingly engages lower clamp projection 180 in locked fashion by means of split lock washer 181. By turning nut 182, the upper 178 and lower 180 clamp projections of hanger 174 can be compressed together to friction-lock the worm shaft 183 against rotation. Worm shaft 183, in turn, is keyed to worm 172 by means of key 185. In this manner, the orientation of planetary gear 28 about axis y—y can be maintained until a new ratio is desired. As will be understood from the description below, changing the orientation of planetary gear 28 is accomplished by turning hand-crank 186 which is attached to wheel 177 so that worm 172 rotates, thereby driving rim 146.

Transaxle spur gear 120 and modified bevel gear 138 normally rotate about axis c—c with equal but opposite angular velocities with respect to housing 36. Bevel gear 138 is integrally formed with, or rotationally fixed, to modified spur gear 188 so as to form a cluster gear such that spur gear 188 also has an angular velocity equal and opposite to that of gear 120. Spur gear 188 in turn meshes with annular spur gear 106 causing cluster gear 104, 106 to rotate on bearings 190, 190 about output shaft 34 and axis x—x. Cluster gear 104, 106 is positionally fixed on shaft 34 by bearings 190, 190 in conjunction with shaft spacer 192, outer bearing race spacer 191, the inner race of bearing 193, the inside shoulder projection of gear 104, and internal retaining ring 194. This shoulder projection, in cooperation with internal retaining ring 195 and spacer 191, properly retains bearings 190, 190 with respect to cluster gears 104, 106.

The orientation of planetary gear 28 can therefore be varied as follows. Initially, thumb nut 182 is loosened to allow cranking of hand crank 186 which causes rotation of worm 172. Worm 172 in turn drives wormwheel rim 146 about axis c—c causing assembly 140 and bridging bevel gear 154, which is continuously being driven about its axis of symmetry, to rotate and orbit respectively about axis c—c. This results in an angular phase displacement of rotating bevel gear 142 relative to contrarotating bevel gear 138 and, further, in an angular phase-shifting displacement of rotating bevel gear 104 relative to rotating bevel gear 94. The latter angular phase-changing displacement causes crown gear 108 to momentarily rotate about the windmilling axis y—y thereby changing the orientation of planetary gear 28 by way of yoke 112 as they also equally rotate about axis y—y.

Planetary shaft 110 and planetary gear 28 are held nonrotatable relative to axis z—z and with respect to housing 36 even as planetary gear 28 orbits about axis x—x while reorienting about axis y—y when the latter is required. Yoke 112, which is rigidly attached to crown gear 108, is thus rotatably attached to shaft 110. A counterweight 196 is provided opposite planetary gear 28 with respect to yoke 112 on shaft 110 in order to pivotally balance gear 28 about axis y—y, shaft spacers 197, 197 being provided to assure such balance as well as proper tooth engagement between planetary gear 28 and intermediary gear 30.

It will be understood that shaft 110 and shaft 62 are interconnected in a manner which allows rotation of shaft 110 about axis y—y and orbital motion of shaft 110 about axis x—x while shaft 110 remains nonrotatable relative to axis z—z. The mechanism for such interconnection will now be described progressing inwardly from bearing plate 42. Shaft 62 is threadably retained within a collar of end plate 198 which in turn is fastened to bearing plate 42 by fasteners 200. Shaft 62 is secured within end plate 198 by way of the close fit between the shaft 62 and the tapered, threaded collar 203 in cooperation with a shoulder formed in shaft 62, external retainer ring 202, and taper matching hex nut 204 which threads onto the tapered thread, e.g., ⅝ taper, on the outside surface of the collar. By threading nut 204, a radial compression force is exerted which effects a friction grip between the collar and shaft 62. A safety slip clutch is thereby provided though it may never be used.

Proper clearance is maintained between shaft 62 and sleeve 82 by the left bearing 88 and the right bearing 89. Shaft 62 further penetrates a pivoting composite yoke radial bearing support structure 227, 212, slidingly supported eccentric bearing 206 located between a left pair of projecting limbs of a left pivoting yoke 208, eccentric bearing 211 slidingly supported between a pair of projecting limbs of a pivoting single yoke 212, a third eccentric bearing 207 slidingly supported between a pair of projecting limbs of a right pivoting yoke 208, bearing 214, sun gear 32, bevel gear 104, and modified sun gear hub for providing an inner race bearing mount for bearing 243 with a clearance shoulder 216 and a retaining ring groove for external retaining ring 217 before terminating within output shaft 34 as noted previously. Bearing 214 is longitudinally secured to shaft 62 by means of an external retaining ring 201 and the shaft spacer 86. The outer race of bearing 214 is secured by means of a shoulder and internal retaining ring 96 located within the left-end opening of output shaft 34. Keyed slots torsionally and respectively secure the inner races of eccentric bearings 206, 207, the outer races of which are slidingly mounted between the dual pairs of projecting limbs of the pivoting dual yoke 208, 208. Similarly, the inner race of eccentric bearing 211 is torsionally secured by a keyed slot while the outer race thereof is slidingly mounted between the single pair of projecting limbs of the pivoting single yoke 212 as will subsequently be described. Similar assemblies including eccentric bearings 213, 215, 216 are provided to eccentrically interconnect outer dual yoke 217, 217 and outer single yoke 220 to planetary shaft 110, wherein the eccentric bearings 211 and 213 are 90° out of phase with the eccentric bearings 206, 215 and 207, 216. The bearings 206, 211, 207, 215, 213 and 216 thus cooperate with the yokes 208, 208, 212, 217, 217 and 220 in conjunction with the radially-oriented, concentric, hollow shaft 222 and the contained, concentric rod 218 in a harmonic drive arrangement where the yokes 208, 208, 212, 217, 217 and 220, which are interconnected to the nonrotatable shafts 62 and 110, serve as harmonic, eccentric, stress-functioning members.

Referring to FIGS. 2c, 2d with reference to FIG. 2a as well as to FIGS. 1b, 1c, FIG. 2c is a left side view of the subassembly characterized by members 208, 208, 212, 217, 217, 218, 220, 222 of FIG. 2a. FIG. 2c positionally interprets a left side view of the subassembly 10 of FIG. 1c. FIG. 2d positionally interprets a left side view of the subassembly 10 of FIG. 1b while FIG. 2a, as formerly noted, corresponds to FIG. 1a. Inner connecting rod 218 is rotatably attached (about axis y—y as viewed in FIG. 2a) to pivoting single yoke 212 and is rigidly affixed to outer single yoke 220. Alternatively, rod 218 can be rotatably attached to yoke 220 and rigidly affixed to yoke 212, or both yoke 220 and yoke 212 can be rotatably attached to rod 218. Rod 218 thereby reciprocates along axis y—y within hollow shaft 222, the magnitude of such relative reciprocation being identified by double headed arrow 224 (as viewed in FIG. 2a), as rod 218 is driven by the rotary motion of shaft yokes 212 and 220.

The connector assembly, including outer yokes 217, 217, pivoting yokes 208, 208 and hollow shaft 222, serves as a connecting rod for the paired eccentric bearings 206, 207 in their rotative connection with the eccentric bearings 215, 216. Pivoting yokes 208, 208 are rotatably attached to hollow shaft 222 which is rigidly affixed to outer yokes 217, 217. Alternatively, hollow shaft could be rigidly affixed to the pivoting yoke 208, structure and rotatably attached to the outer yoke 217, structure or both outer yokes 217, 217 and pivoting yokes 208, 208 could be rotatably attached to hollow shaft 222. Due to the eccentric bearings 206, 206 and 215, 215, as well as the presence of the axial restraint of the linear-rotary bearing 226, this connector assemblage will reciprocate along axis y—y relative to bearing 226, the magnitude of relative reciprocation again generally identified by double-headed arrow 224 (FIG. 2a), the reciprocation being 90° out of phase with the reciprocation of rod 218. Break lines 231, appearing in FIGS. 2c, 2d, provide for proper longitudinal freedom of hollow shaft 222 within the linear-rotary bearing 226 of FIG. 2a. Were freedom-of-rotation about the y—y axis to be confined to the upper yoke assemblage with respect to hollow shaft 222, the linear-rotary bearing 226 could be replaced by a linear ball bushing or equivalent. As is obvious, rod 218 can reciprocate freely within hollow shaft 222 also with respect to bearing 226. It should be noted that rod 218 and hollow shaft 222 do not reciprocate with respect to inertial space, providing housing 36 is in its inertial state, because they rotate about two respective fixed axes relative to and within housing 36. Consequently, any chosen reference marker on either the rod 218 or the hollow shaft 222 will move along eccentric, circular paths with respect to axis x—x of housing 36. However, given an angular velocity to the input shaft 66, there must occur alternating, cyclic positive and negative angular accelerations imparted to the rod and hollow shaft, simultaneously, superimposed on the angular velocity of axis y—y with an equivalent, averaged angular velocity in its driven rotation about the perpendicularly intersecting axis x—x. The orbiting eccentric shaft, or the orbiting crank shaft, regarding that hardware mounted thereon, as the case may be, need not be dynamically balanced about its axis z—z, as is typically required thereof, since no rotation occurs about this axis. Connector assembly bearings 206, 206, 215, 215 can have radial load ratings that are one-half of that of crank bearings 211 and 213.

Hollow shaft 222 and associated assemblies are radially positioned by bearing 226, which can be, for examples, a linear rotary bearing (shown) or a sleeve bearing, either being mounted within intermediary dual-faced, bevel gear 30. It will be appreciated that gear 30 is formed of two modified bevel gears fastened together by a series of spaced alignment fasteners 228 such that bearings 226 and 230 are captured by opposing shoulders of gear 30 as the halves are fastened within the formed groove. Bearing 230 is further secured by opposing shoulders of the two-part ring clamp 232, centered around axis y—y, and which is compressed together by alignment fasteners 234. Additionally, alignment fasteners 234 fasten ring clamp 232 to the paired ring bearing housings 236, 236, each of which is centered about axis x—x. Each of bearing housings 236, 236 has a generally cylindrical outer face which is interrupted by flat faces against which the ring clamp 232 bears. The counterbalance support frame 238 is similarly attached to housings 236, such that it bears against diametrically opposed flat faces thereof, by alignment fasteners 240. Counterweight 114, frame 238 gears 28, 30 and 108, and related assemblies thus orbit on bearings 242, 243 about axis x—x.

Referring to FIGS. 2c, 2d, eccentric bearing pairs 206, 207 and 215, 216 which are mounted on four bearing shaft pairs 244/245, 244/245 and 246/247, 246/247, respectively, reciprocate along geometric chordal paths, respecting the orbital configuration, within linear bearings (not shown) of yokes 208 and 217, respectively. Similarly, eccentric bearings 211 and 213, which are mounted on bearing shaft pairs 248, 249 and 250, 251, respectively, reciprocate along geometric chordal paths, within linear bearings (not shown) of yokes 212 and 220, respectively, though such reciprocal motion is 90° out of phase with the motion of bearings 206 and 215. Therefore, as the nonrotatable planetary shaft 110, aligned on the axis z—z, orbits with orbital radius 252 of orbit 253 about axis x—x, the tangential components of the resulting reciprocating motions effect substantially no work but rather stresses which act on eccentric bearings 206, 211, 213, 215, such that these eccentric bearings 206, 211, 213, 215, are involved in the prevention of rotation as regards the planetary gear 28 about its symmetry axis z—z.

The cut-out portions of FIGS. 2c, 2d show the radial bearings 254, 255 which allow rotatable attachment of yoke 212 to rod 218 and of yokes 208, 208 to hollow shaft 222 as regards axis y—y. Yoke radial bearing support structures 227, 227 either rotatably secure the outer race or portion of bearing 254 to yokes 208, 208 or to yokes 217, 217 and can be dimensionally identical. Spanner nut 223 can either rotatably secure the inner race, or equivalent, of bearing 254 to hollow shaft 222 or can integrally secure hollow shaft 222 to the upper yoke support structure member 227, as viewed in FIGS. 2c, 2d via a one-piece dummy bearing (not shown) in cooperation with an upper spanner nut 223 which features one of its spanner slots 221 in FIG. 2d. The outer race, or equivalent, of bearing 254 is integrally secured to the yoke bearing support structure 227, as viewed in partial cutaways in FIGS. 2c, 2d by the yoke structure bearing clamping plate 225. Shouldered fasteners 228 alignedly secure the clamping plate 225 and the yoke support structure 227 to the dual yokes 208, 208 thus dimensionally aligning the yokes 208, 208. This structural function equally applies to upper members 225, 227, 228, where a dummy single-piece bearing can substitute for bearing 254, with the resulting required dimensional aligning of yokes 217, 217, also as viewed in FIGS. 2c, 2d. Single yoke radial bearing support structures consist of respective integral bearing cavities cut within the yokes proper. One such cavity is depicted in cutaways of the single yoke 212 appearing in FIGS. 2c, 2d, as well as implied in single yoke 220 thereof. The outer race, or equivalent, of bearing 255 is shown clamped to a shoulder of the single yoke 212 cavity by means of the bearing clamping plate 221 in cooperation with shouldered fasteners 228. The inner race of bearing 255 is shown integrally secured to a reduced-diameter portion of rod 218, it being fastened thereto by the clamping force which occurs between the resulting shoulder and the opposing flange washer/locknut combination 229 as is apparent. The identical bearing mounting technique can be utilized at the upper, or opposing, end of rod 218, such mounting technique being signified by the upper bearing clamping plate 221 and fasteners 228 with respect to yoke 220, as best viewed in FIG. 2d and depicted by dashed lines in FIG. 2c. A single-piece dummy bearing would presumably be utilized within the bearing cavity of single yoke 220 so as to provide for integral attachment of the rod 218 to yoke 220. Because left side views are depicted in FIGS. 2c, 2d with reference to FIG. 2a, a left end view of stationary shaft 62, longitudinally aligned in centered symmetry with axis x—x, appears as such in both FIG. 2c and FIG. 2d. By way of this harmonic drive arrangement, planetary shaft 110 is held rotationally fixed as it orbits around axis x—x and as planetary shaft 110 pivots about axis y—y.

In operation, the illustrated embodiment provides a transmission 26 wherein the transmission ratio can be varied by changing the orientation of the planetary gear 28 relative to the orbital plane defined by an orbit of planetary gear 28 about axis x—x. As described, rotational motion of input shaft 66 is translated into orbital motion of planetary gear 28 through the interaction of gears 70, 80, 94, 108, 98, 116, 120, 142, 154, 138, 188, 106, 104 and associated linkages. The orbital motion of planetary gear 28 is translated into rotational motion of output shaft 34 through the interaction of the angle existent between the planetary's axis of symmetry and the orbital plane, in addition to the intermediary gear 30 and sun gear 32. The orientation of planetary gear 28 is changed, e.g., from its orientation of FIG. 2a to that of FIG. 3, by turning hand crank 186 which results in a relative angular displacement, or phase shifting, between gears 94 and 104 which in turn results in rotation of crown gear 108 and, consequently, pivotal rotation about the radially-sweeping axis y—y of the planetary gear 28's nonrotatable but orbiting shaft 110 with its axis of symmetry z—z.

Changing the orientation of planetary gear 28 about the radial axis y—y relative to the orbital plane thereof changes the transmission ratio of the transmission 26 as described above in connection with FIGS. 1a–1c. In the orientation of FIG. 2a, which corresponds generally to FIG. 1a, an input shaft 66 rotation rate of $1\omega$ results in an output shaft 34 rotation rate of $0\omega$ if planetary gear 28 and sun gear 32 are of equal pitch diameters and providing that spur gears 70, 80 are also of equal pitch diameters. A transmission ratio of $1:0 = 1/0 = \infty$ is thereby achieved. In the orientation of FIG. 3, which corresponds generally to FIG. 1c, an input shaft rotation rate of $1\omega$ is translated into an orbital rate of planetary gear 28 of $1\omega$ if planetary gear 28 and sun gear 32 are of equal pitch diameters and providing that spur gears 70, 80 have equal pitch diameters resulting in an output shaft 34 rotation rate of $2\omega$. A transmission ratio of $1:2 = \frac{1}{2} = 0.5$ is thereby achieved. The transmission ratio corresponding to FIG. 1b is $1:1 = 1/1 = 1$. This range of transmission ratios is equivalent to a magnitude 2 of the output shaft angular velocities when compared to the given input shaft angular velocities, this resulting from a 180° change in the orientation of planetary gear 28 about axis y—y. It is to be understood that an infinite number of intermediate orientations of planetary gear 28 about the radial axis y—y can be utilized to achieve an infinite number of intermediate transmission ratios. In further understanding, because of the infinite ratio of 1:0, the magnitude 2 can infinitely be expanded to a desired value by means, for example, of utilizing a spur gear set attached to output shaft 34. Yet further, the transmission 26 will function properly for either of the two possible directions or rotation of input shaft 66. And yet further, the input shaft 66 may become the driven as the output shaft drives, e.g., using the engine for braking.

Figures 7A, 7B:
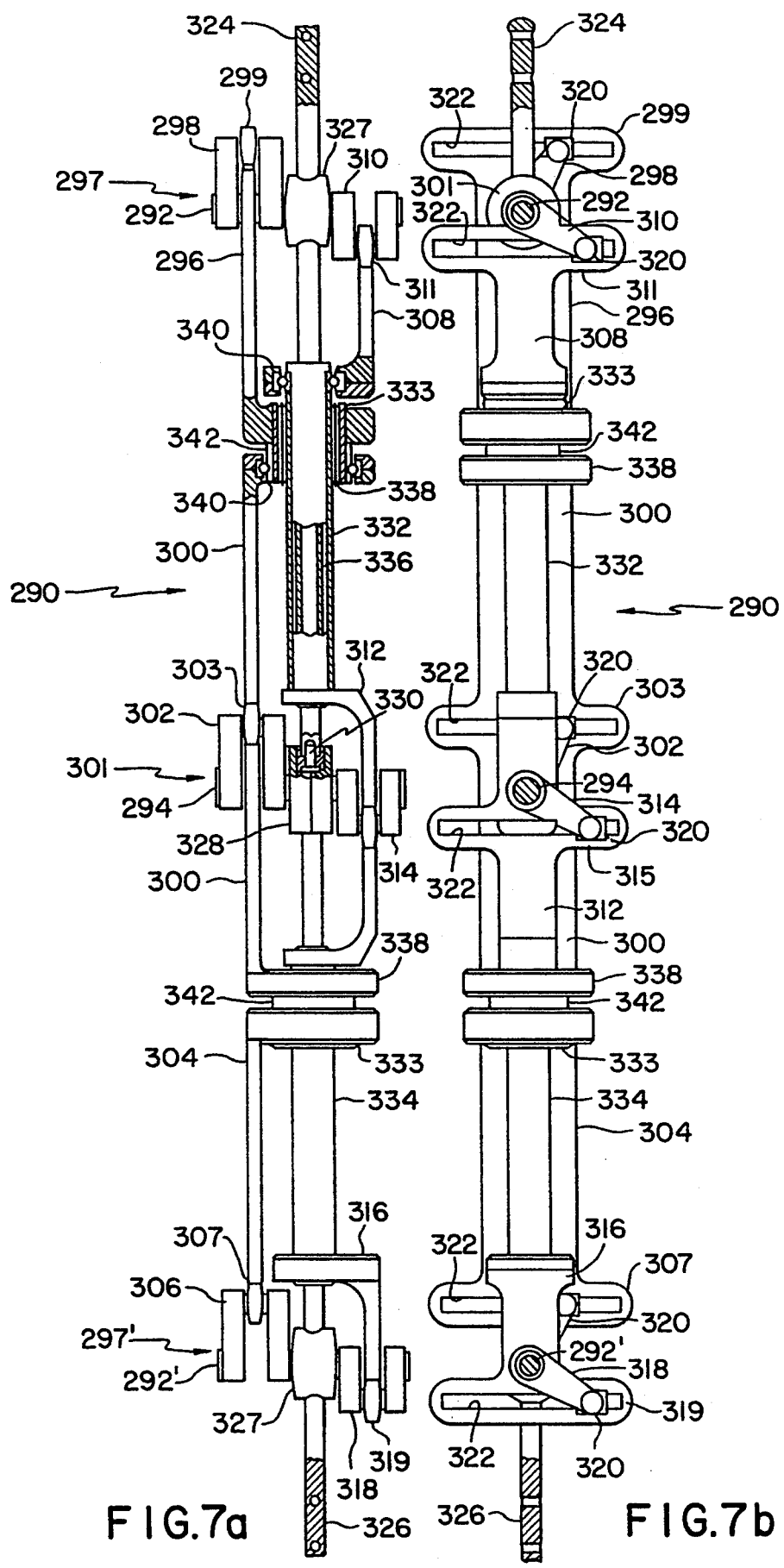

Many other means for interconnecting planetary gears and fixed or stationary shafts are possible in accordance with the present invention. For example, orbital shafts can be interconnected to a fixed or stationary shaft by way of cranks rather than the eccentric bearings depicted above. Referring to FIGS. 7a and 7b, front and side views, respectively, of an apparatus 290 for interconnecting planetary shafts 292 and 292' to the central, nonrotatable shaft 294 are shown. It will be appreciated that the apparatus 290 can be used in connection with an embodiment wherein a second planetary gear is employed opposite the first planetary gear. Of course, a second intermediary gear is also provided to interconnect the second planetary gear to the sun gear.

The apparatus 290 comprises first and second reciprocating side rod assemblies. The first subassembly includes an upper side rod 296 which is interconnected to planetary shaft 292 by way of a double-throw crankshaft 297 but, more immediately, by means of crank and yoke 298, 299, respectively and which are components thereof, middle side rod 300 which is interconnected to the central, nonrotatable shaft 294 by way of crank and yoke 302, 303, respectively, of double-throw crankshaft 301, and lower side rod 304, which is interconnected to planetary shaft 292' by way of crank and yoke 306, 307, respectively, of double-throw crankshaft 297'. Shaft spacers 342 separate rod 296 from rod 300 and rod 304 from rod 300, respectively. The second subassembly comprises upper side rod 308 which is interconnected to planetary shaft 292 by way of crank and yoke 310, 311, respectively, middle side rod 312 which is interconnected to planetary shaft 294 by way of crank and yoke 314, 315, respectively, and lower side rod 316 which is interconnected to planetary shaft 292' by way of crank and yoke 318, 319, respectively. In each application of the six crank and yoke pairs of FIGS. 7a, 7b, the cranks are connected to slide bearings 320 which are slidably mounted within longitudinal channels 322 of the respective side rods. Thus, each of the subassemblies reciprocates radially as the planetary shafts 292 and 292' nonrotatably orbit about the central shaft 294 due to the crank and yoke interconnections between the subassemblies and fixed shaft 294. Preferably, the radially rotating reciprocations of the subassembly side rods are 90° out of phase as also applies to the angles formed between the crank pairs 298, 310 and 306, 318 of the double-throw crankshafts 297, 301, 297', respectively.

The apparatus 290 further comprises a radial tie-rod assembly including upper tie-rod 324 and lower tie-rod 326, each of which is rotatably connected to central bearing housing 328 at an inner end thereof, for example, by taper pin connectors 330 to a thrust bearing. Bearing housing 327 forms an integral part of upper tie-rod 324. Bearing housing 327' forms an integral part of lower tie-rod 326. The outer ends of the upper and lower tie-rods 324 and 326 can be attached to crown gears via the latter's integral yokes such as depicted in FIG. 2a as member 112 thereby rotationally coupling the apparatus 290 to the transmission input shaft. The upper tie-rod 324 is rotatably interconnected to planetary shaft 292 by means of the mid bearing of the double-throw crankshaft 297 and the lower tie-rod 326 is rotatably interconnected to planetary shaft 292' by means of the mid bearing of the double-throw crankshaft 297'. These mid bearings are contained within the bearing housing 327 and the bearing housing 327', respectively.

Middle side rod 312, which includes upper and lower sleeve portions 332 and 334, is slidably and rotatably mounted on the tie-rod assembly by linear rotary bearings 36. The first side rod assembly, in turn, is rotatably and slidably mounted on middle side rod 312 by linear rotary bearings 338. In addition, the upper side rods 296 and 308 and lower side rods 304 and 316 of each side rod assembly are rotatably interconnected to the middle side rods 300 and 312 thereof by rotary bearings such as appear in cutaways as 340. Shaft spacers 342 act to separate the adjacent members 296, 300 as well as 304 from 300 in their relative circular motions, one from the other. External retaining rings 333, 333 secure the outer races, respectively, of the bearings 338, 338 in conjunction with external mounting flanges thereof. It will be appreciated that the apparatus 290 is of the dimensional proportions to provide practicable clearances in its oscillatory relative motions with respect to the internal openings of the ambient, respective intermediary gears. Upper tie-rod 324 and lower tie-rod 326 experience contrarotating motions about axis y—y as phase changing occurs within the germane transmission.

Referring to FIG. 9a, a side view of a still further alternative mechanism 494 for allowing orbital gears 496 and 497 to orbit about an orbital axis without rotating about their respective central axes 498 and 499 is shown schematically. The mechanism 494 comprises two connecting rod subassemblies 500 and 502 which are pivotally interconnected to fixed crank bearing 504 by crank arms 506 and 508, respectively. Each of the connecting rod subassemblies 500 or 502 includes a pair of sliders 510 slidably mounted on a way 512. The sliders 510 of each subassembly 500 or 502 are interconnected by connecting rods 514 as will be described in more detail below.

The subassemblies 500 and 502 are drivably interconnected to the gears 496 and 497 by crank arms 516 and 518 respectively. In this regard, it should be noted that crank arm 506 is in phase with crank arm 516, and crank arm 508 is in phase with crank arm 518, such that the gears 496 and 497 and subassemblies 500 and 502 are capable of nonharmonic drivable interconnection. As used herein, the term "nonharmonic" refers to periodic motion wherein the acceleration of a member is not directly proportional to the displacement of the member from a reference position. The ways 512 are maintained in a fixed 90° phase relationship as shown and can be interconnected by a tie rod 520 for increased stability.

The mechanism 494 is shown in three angular locations, indicated by the solid, dashed, and double-dashed representations of FIG. 9a, corresponding to progressive orbital movement of the gears 496 and 497. As the drawing illustrates, orbital motion of planetary gears 496 and 497 is coupled with oscillatory motion of the subassemblies 500 and 502 in a manner such that the gears 496 and 497 are held nonrotatable. Although not shown, it will be appreciated that a second mechanism associated with third and fourth planetary gears could be provided in a mirror-image relationship with the illustrated mechanism 494 to provide counterbalance and increase power flow density.

Referring to FIG. 9b, a front view of a portion of mechanism 494 near the orbital axis is shown to illustrate the means by which the connecting rods 514 pass one another without mechanical interference therebetween. As noted above, each of the subassemblies 500 or 502 (FIG. 9a) includes a pair of connecting rods 514. The rods 514 are displaced as shown in FIG. 9b such that the rods 514 can oscillate along ways 512 without interference. Because the two ways 512 are structurally fixed at 90° with respect to one another as they rotate and because the crank bearing 504 is fixed with respect to this rotation, the resulting interaction of crank arms 506, 508 with crank arms 516, 518 act to hold the orbital gears 496, 497 nonrotatable about their respective axes of symmetry provided they are geared together by a non-differential means. The gear-crank arm wrist pin bearings 517, 519 consequently bear a 90° phase-locking relationship although both being circumferentially located at 10:30 o'clock on their respective gears 496, 497.

Figure 8:
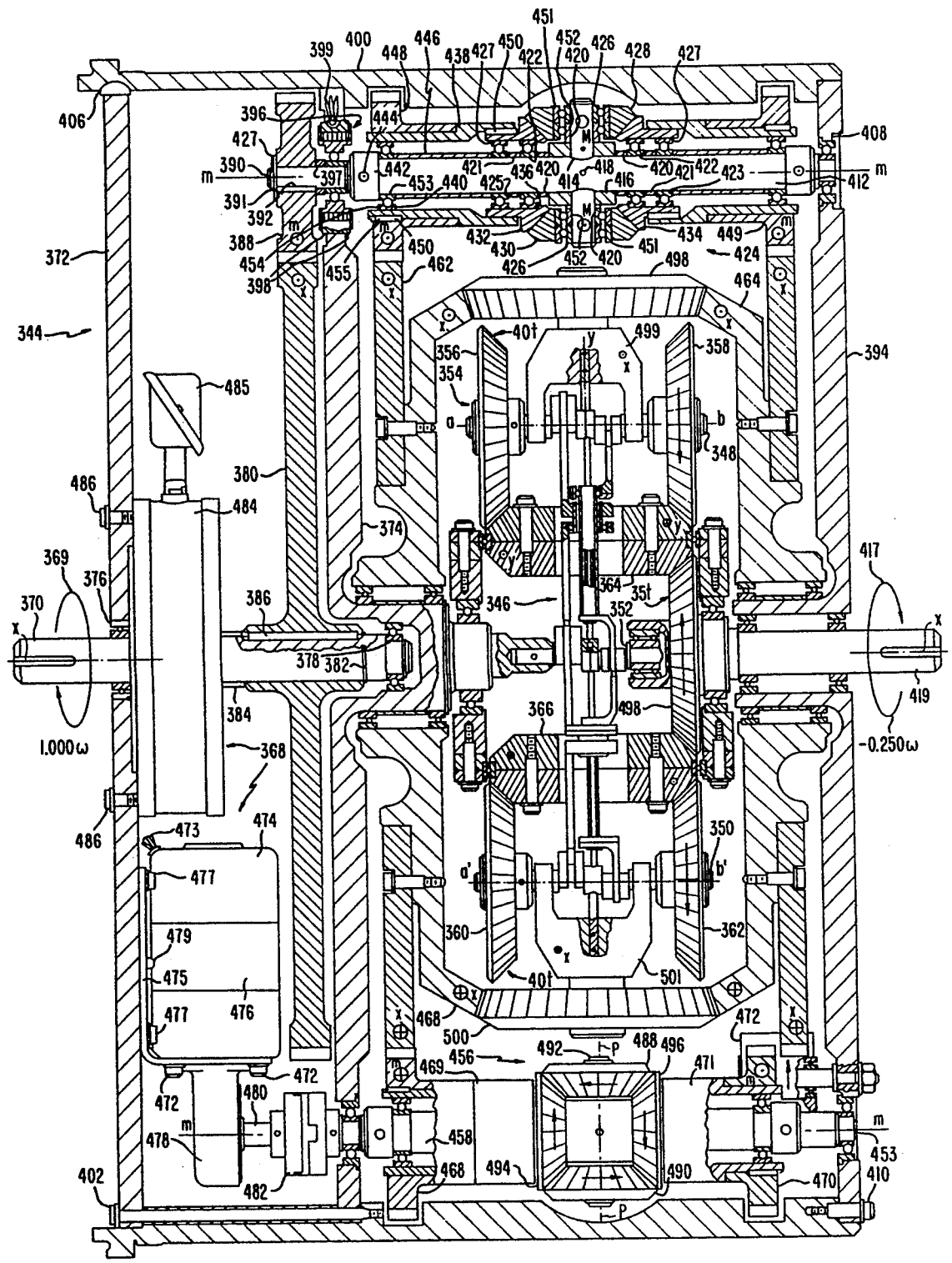
FIG. 8 is a front, partially cross-sectioned view of an apparatus constructed in accordance with an alternative embodiment of the present invention.

Referring to FIG. 8, a transmission constructed in accordance with an alternative, more robust embodiment of the present invention, applicable to mobile propulsion adaptation and other applications, is generally identified by the reference numeral 344. The transmission 344 incorporates an apparatus 346 for interconnecting planetary shafts 348 and 350 to the central, nonrotatable shaft 352. The apparatus 346 is identical to the apparatus 290 of FIGS. 7a and 7b and therefore will not be described in detail again. In addition, the transmission 344 includes a planetary gear assembly 354 similar to the planetary gear assembly described in connection with FIGS. 2a and 3 heretofore described. However, it will be appreciated that the planetary gear assembly 354 includes a pair of planetary gears 356, 360, optional counterbalancing gears 358, 362—in lieu of counterbalancing masses, for example, member 196 of FIG. 2a—and a pair of identical intermediary gears 364 and 366, rather than the single planetary and intermediary gears shown in FIGS. 2a and 3.

Also, regarding the transmission 344 of FIG. 8, although the planetary gears 356, 360 are held nonrotatable about their axes of symmetry, namely axis a and axis a′, respectively, the optional counterbalancing gears 358, 362 do rotate and in those rotational directions illustrated in FIG. 8 in accord with the operational status depicted therein. Gears 358, 362 rotate about their rotational axes b and b′ which are aligned extensions of the two axes of symmetry a and a′, respectively. This particular operational status of FIG. 8 describes the input shaft 370 as turning in the rotational sense of arrow 369 with an angular velocity of $1.000\omega$; the planetary gears 356, 360 possess 40 gear teeth each and are in their angular orientations of $-90°$ with respect to their common axis y—y; the two intermediary gears 364, 366, with their inconsequential but equal numbers of matching teeth, are in their contrarotating states about their common axis y—y—their rotational directions indicated by the cross-sectional, rotational symbology $_y$ and $\oplus y$; the sun gear 498, possessing 35 teeth, and the integral output shaft 419, with its reverse rotational rate of $-0.250\omega$, are denoted by the rotational sense of directional arrow 417.

Further, as the crown bevel gears 498, 500 are required to contrarotate about the axis y—y when phase shifting takes place from one transmission gear ratio to another, the respective planetary gears 356, 360, as is appreciated, must concomitantly contrarotate about the axis y—y. Therefore, as these two planetary gears rotate from their identical $-90°$ orientations to their 0° orientations, they must do so in opposite rotational directions such that, at the 0° orientation, their axes of symmetry have become opposingly parallel and then, upon attaining 90° orientations, respectively, these two axes of symmetry again have a parallel relationship exactly as they had at their $-90°$ positions. It is to be realized that these dual progressions of reorientation do not conflict with the power flow through the transmission because of the ordinate symmetries which exist within the sinusoidal family of curves at their minimum and maximum vertical coordinate points.

Additionally, transmission 344 includes a number of unique features. First: the transmission 344 includes components 368 of a closed loop, feedback servomechanism so as to allow the transmission ratios, existent between the input shaft 370 and the output shaft 419, to be infinitely selected responsive to changing operating conditions. Second: the transmission 344 includes a symmetrically stressed gear system for use in transmitting a greater power density through transmission 344 via the input shaft 370 to the planetary gear assembly 354 and, finally, to the output shaft 396, thereby effecting transmission ratio selection, this, in turn, permitting greater power density control. Third: the planetary gear assembly 354, as described below, allows for infinite transmission ratio variation across a range of transmission ratios extending from between $-0.25$ to $1.75$ without disengaging gears. Further unique aspects of the transmission 344 will be apparent upon consideration of the description below.

The input shaft 370 is rotatably mounted within housing members 372 and 374 by bearings 376 and 378, respectively. Input gear 380 is mounted on input shaft 370 by way of external retaining ring 382, shaft spacer 384 and key 386 such that gear 380 rotates integrally with shaft 370. Gear 380, in turn, drives spur gear 388 which is rotationally locked to shaft 390 by key 392. Key 392 is longitudinally secured within its way by external retaining ring 427, shaft washer 391 and opposing shaft spacer 397. Shaft 390 is rotatably secured near its left end thereof by bearing pressure transducer unit 396 which, in turn, is secured by internal retaining rings 398, 398 to housing member 374. Pressure transducer circuit leads are identified by number 399. The housing member 374 is secured to cylindrical housing 400 and housing member 372 by a plurality of circumferentially spaced fasteners 402 and spacers 404. In addition, the housing member 372 is angularly aligned with respect to cylindrical housing 400 by alignment key 406. Shaft 390 is rotatably secured to housing member 394 by flange bearing 408 at its right end. The housing member 394 is also attached to cylindrical housing 400 by a plurality of circumferentially spaced fasteners 410.

As shown in FIG. 8, shaft 390 includes a widened central portion 412. This widened portion 412 enhances the flexural stiffness of the shaft 390 and provides a thickness sufficient to allow shaft 414 to be inserted therethrough. Shaft 390 is further stiffened by reinforcer block 416. Shafts 390 and 414 and block 416 are fastened together by pin 418. Four of the faces of block 416 serve as bases for spacers 420 which abut against the inner diameter portions of bearings 422, 422, 452, 452 used in cooperation with bearings 423, 423 and flange bearings 451, 451, the former pair of which are interspaced by shaft spacers 421, 421 so as to cooperatively position the bevel gears of differential assembly 424. The bearings 451, 451 are retained at the outer edges of their inner races by external retaining rings 426, 426.

The differential assembly 424 includes upper 428 and lower 430 bevel gears rotatably mounted on shaft 414 in addition to left 432 and right 434 bevel gears rotatably mounted on shaft 390. Although the illustrated assembly 424 includes both upper 428 and lower 430 bevel gears, it will be appreciated from the description below that the assembly could be constructed with either the upper 428 or the lower 430 bevel gear absent or replaced by a counterweight. The teeth of upper 428 and lower 430 bevel gears mesh with the teeth of left 432 and right 434 bevel gears at the interfaces therebetween. The left bevel gear 432 is axially positioned by way of its shoulder 436 and internal retaining ring 427. Differential sleeve 438 extends the kinematic action of gear 432 concentrically leftward about shaft 390 by means of key 450 and bearing 453, the latter of which is internally secured within sleeve 438 by means of internal retaining rings 440, 454. Sleeve 438 is further secured axially by means of shaft spacer 446 which maintains the separation between bearings 423 and 453 and, thereby, the required axial placement of gear 432 relative to sleeve 438. Assembling of collar 442 compressively onto shaft 390 so as to remove longitudinal play from members 453, 446, 423, 421, 422, 416 including 442 is effected by the insertion of taper pin 444 through members 442, 390 and secured therein by coining as shown. Left spur gear 448 is then longitudinally secured to the differential sleeve by mounting it upon the sleeve's lesser outside diameter. It is there secured by external retaining ring 455 as depicted. Left spur gear 448 is rotationally locked to sleeve 438 by key 450 which, in turn, is secured in place by means of the key way termination combined with the blocking effect of the external retaining ring 455. Similarly, the right, comparable bevel gear 434 is axially positioned by a mirror-image sequence of these assembled parts as may be viewed in FIG. 8. Thus, three shafts, with their respective spur gears 388, 448, 449, constitute the three input/output shafts of a differential gear drive. This differential assembly 424 functions to provide the continuous but divided power flow through the two phase-shiftable cluster gears 460, 462 and 464, 466 even as phase-shifting occurs.

The transmission 344 further includes a second, phase-shifting differential assembly 456 positioned on shaft 458. As shown, the second differential assembly 456 is similar to the differential assembly 424, in construction, and is diametrically opposed, in location, to assembly 424 relative to cluster gear units 460, 462 and 464, 466. It should be noted, however, that the second differential assembly 456 and shaft 458 need not be positioned in a diametrically opposed relationship to the assembly 424, as identified in FIG. 8, it being done so for illustrative purposes.

As has been disclosed, the differential assembly 424 is utilized as a general application differential in that inflowing power from one of its three shafts is proportioned by demand and so meted out to the other two shafts accordingly, or in reverse function when called for. The differential assembly 456, to the contrary, is utilized as a phase-controlling mechanism. As a control mechanism, differential assembly 456 acts to either prevent any phase shifts from occurring or to cause an intended phase shift to take place including the controlling of the magnitude and duration of such a phase shift.

Accordingly, differential assemblies 424 and 456 combine to effect infinite transmission ratio variations as follows. The spur gear 388 drives shaft 390 of the assembly 424. The left 432 and right 434 bevel gears of assembly 424 divide the inflowing power from spur gear 388 so as to respectively drive left cluster gear 460, 462 and right cluster gear 464, 466. These cluster gears 460, 462 and 464, 466 are coupled to differential shaft 458 by way of spur gears 468 and 470, the latter through reversing pinion gear 472. In constant transmission ratio operation, no rotation of bevel gears 428, 430 occurs about their common axis o—o and shaft 414 fixedly rotates about axis m—m at an angular velocity rate proportional to that of Shaft 390 with respect to that of the input shaft 370. Under this state of constant ratio maintenance, the paths of power flowing through left cluster gear 460, 462 and right cluster gear 464, 466 are of substantially equal magnitudes. However, in order to cause an angular displacement between cluster gear 460, 462 and cluster gear 464, 466 to occur, so as to cause a change in the transmission ratio, the division of power must be transiently altered such that the cluster gears 460, 462 and 464, 466 momentarily rotate at different angular velocities/accelerations with respect to one another. As will be appreciated from the description following, these varying divisions of power flow are controlled by the transmission's laser digital encoder 474 or equivalent, D.C. servomotor with brake 476, ratio control gear box 478, shaft 480 and Oldham coupling 482. Thus, in constant transmission ratio operation, as depicted in FIG. 8, the upper 488 and lower 490 bevel gears of assembly 456 do not rotate about the longitudinal axis n—n of shaft 458, unlike upper 428 and lower 430 bevel gears of assembly 424 which rotate about the longitudinal axis of shaft 390. Rather, bevel gears 488 and 490 contrarotate with equal and opposite angular velocities/accelerations about the axis p—p of their common shaft 492 with respect to shaft 458. The spur gear 468, by way of its sleeve assembly 469, is integrally attached to bevel gear 494 while spur gear 470, by way of its foreshortened sleeve assembly 471, is integrally attached to bevel gear 496. Because the reversing pinion gear 472 exactly reverses the angular velocities/accelerations of gears 470, 496 with respect to the angular velocities/accelerations of gears 468, 494, providing there occur no differences in the rates of rotations of cluster gears 460, 462 with respect to 464, 466, no rotation of shaft 492 about axis n—n of shaft 458 takes place. Conversely, if shaft 480 drives shaft 458, thereby causing shaft 492 to rotate about axis n—n of shaft 458, a change from the unison states of rotations of cluster gears 460, 462 with respect to the cluster gears 464, 466 must occur. A phase change is consequently effected, thus causing a rotation of crown gear 498 and its integral yoke 499 in a counter-rotation of equal magnitude of crown gear 500, along with its integral yoke 501, about their common y—y axis. Thus, under the steady-state conditions of constant angular velocities relative to the input and output shafts 370, 419, respectively, no progressive teeth engagements occur between bevel gears 428, 430 and their adjacent, intermeshed bevel gears 432, 434 of differential 424 whereas bevel gears 488, 490 contrarotate about axis p—p, as shown by their respective directional arrows as determined by the rotational sense vector 372 of input shaft 370, while bevel gears 494, 496 contrarotate about axis n—n, as shown by their respective directional arrows as also determined by the rotational sense vector 372 by way of the interconnected link trains therebetween, these four gears 488, 490, 494, 496 continuously coursing through the changing of the meshing of respective teeth exactly in opposite contrast to the functional state of differential 424.

The transmission ratio of the illustrated transmission of FIG. 8 can be selected responsive to electrical signal information from torque and angular velocity sensing units, namely, the bearing pressure transducer unit 396 and tachometer 484, with servo circuit connection box 485 shown. When input gear 380 drives spur gear 388, torque stresses are present in both. The torque applied from input gear 380 to spur gear 388 causes a pressure stress to be exerted laterally on the self-aligning bearing of transducer unit 396 in proportion to the torque transmitted from the one gear to the other. This pressure stress is converted into an altered electrical signal by the pressure-to-electrical energy transducer of unit 396 via its leads 399. The resulting electrical signal change is proportional to the input shaft torque change. The tachometer 484, which may be a conventional tachometer, is mounted on housing member 372 by fasteners 486 and provides electrical signals proportional to the rates of rotation of the input shaft 370. The electrical signals provided by the tachometer 484 and transducer unit 396 are communicated to an on-board computer which calculates and controls the speed output of the transmission's power source per instructions from a built-in programmer specifically designed for the torque-speed curves of that particular power source as well as for the dynamic characteristics of a particular load coupled to the transmission's output shaft. The load's torque and speed demands are instantly determined by processing the incoming signals of the tachometer 484, the transducer 396, and angular positions of the planetary gears 356, 360, about their common y—y axis, as provided by the encoder 474. The computer then is able to acquire the torque and speed information of the transmission's output shaft 396 at that instant. The transmission 344 thereby has its gear ratio immediately and continuously updated in value as determined and governed by an insertable programmer card, of the on-board computer, thereby optimally matching a power source to a particular load so as to provide desired engine efficiencies, so-called performance characteristics, adjustments to various driving conditions, or to provide a constant angular velocity output, e.g., in order to generate a 400 hz electrical source from a variable angular velocity input, to note but several useful applications. In this last-noted application, the on-board computer would preferably be referenced to and governed by an included, calibrated, frequency-controlling, crystal source.

Members 474, 476, 478 can be integrally housed and secured to the mounting bracket 475 by means of fasteners such as 472. The mounting bracket 475 is aligned and secured to the housing member 372 by alignment dowels, such as 479, and fasteners, such as 477, respectively. Leads, which join members 474, 476 to the computer servo circuit, appear as 473 in FIG. 8. Accordingly, the computer communicates with servomotor 476 to effect selection of an appropriate transmission ratio. The servomotor 476 effects selection by driving shaft 480, which by way of coupling 482, shaft 458, differential assembly 456, gears 468 and 470 in addition to reversing pinion gear 472, causes an angular displacement between cluster gears 460, 462 and 464, 466 thereby changing the orientation of the transmission's planetary gears 356 and 360 about their common axis y—y.

The transmission ratio of illustrated transmission 344 can be infinitely varied across a range of ratios between, as for example, −0.25 and 1.75. In the embodiment of FIG. 8, this is accomplished by providing planetary gears 356, 360 with larger pitch diameters than the sun gear 498. Alternatively, the same range could be achieved by providing dual-faced intermediary gears 364 and 366 with differing pitch diameters on their opposite faces. As shown, the sun gear 498 has a pitch diameter which is 87.5% of the pitch diameters of the planetary gears 356, 360. These pitch diameters translate, for example, into sun gear 498 having 35 teeth and planetary gears 356, 360 having 40 teeth.

According to the present invention, a variety of transmissions can be constructed wherein the transmission ratio is varied by varying the orientation of a planetary torque wheel's axis-of-symmetry relative to an orbital plane of the torque wheel. Referring to FIGS. 4a–4c, a planetary torque wheel assembly comprising a sun sprocket wheel 256, a planetary sprocket wheel 258, a three-dimensional torque transmitting chain 260, and a dual idler sprocket 262, is shown wherein the planetary sprocket 258 is constrained not to rotate about its rotational axis of symmetry. For the purposes of this description, the planetary wheel 258 will be assumed to orbit about the sun wheel 256 in an orbital rotation which causes it to emerge from the plane of the FIG. 4a sheet. However, it is to be understood that the opposite orbital direction could be employed.

Referring to FIG. 4a, as planetary wheel 258 orbits about sun wheel 256 as described above, with planetary wheel 258 constrained not to rotate, the front portion or strand segment of chain 260 is drawn towards planetary wheel 258 such that the front sprocket wheel of dual idling sprocket wheel 262 rotates in the direction indicated by arrow 266. The effect of the orbital motion of the nonrotatable planetary wheel 258 and the effect of the movement of the double strand segments or loop of chain 260 engaged about sun wheel 256 are self-canceling. Thus, if sun wheel 256 and planetary wheel 258 have an equal number of sprocket teeth, an orbital cyclic rate of the planetary wheel 258 of 1ω results in a rotation rate of 0ω of output shaft 264 in this −90° orientation depicted as FIG. 4a.

Referring to FIG. 4b, in the 0° configuration as shown, orbital motions of the nonrotatable planetary wheel 258 and dual sprocket wheel 262 do not result in chain movement about planetary wheel 258, i.e., corresponding chain links and sprockets remain locked. Consequently, an orbital cyclic rate of the planetary wheel 258 of 1ω results in a rotation rate of 1ω on output shaft 264.

Referring to FIG. 4c, orbital motions of the nonrotatable planetary wheel 258 and dual sprocket wheel 262 result in movement of the front portion of chain 260 towards sun wheel 256 as indicated by the rotation 268 of the front sprocket wheel of idler sprocket wheel 262. An orbital cyclic rate of 1ω of planetary wheel 258 results in a rotation rate of output shaft 264 of 2ω as the effects of the orbital motion of planetary wheel 258 and the movement of chain 260 are additive in this 90° orientation depicted as FIG. 4c.

Thus, for a continuous input orbital cyclic rate of 1ω, the output rotation rate can be varied from 0ω to 2ω, where the planetary wheel 258 and sun wheel 256 have equal numbers of sprocket teeth, by changing the orientation of the planetary wheel 258 axis-of-symmetry relative to the orbital plane thereof. Again, although only three orientations are shown, it will be understood that intermediate output rotation rates can be achieved by selecting an appropriate intermediate orientation. In addition, the range and direction of output rotation rates achievable can be varied by selecting a planetary sprocket wheel and a sun sprocket wheel having different numbers of sprocket teeth.

Figure 5:
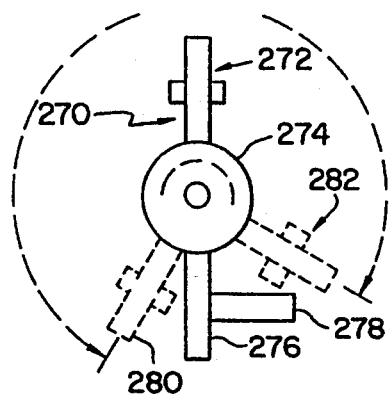
FIG. 5 is a front view of a planetary torque wheel assembly constructed in accordance with an alternative embodiment of the present invention.

FIG. 5 depicts another planetary torque wheel assembly 270 constructed in accordance with the present invention. The assembly 270 comprises a zero-spin planetary helical gear 272, an intermediary helical gear 274, and a sun helical gear 276, mounted on output shaft 278. A first orientation of the planetary gear is shown with alternate orientations depicted in phantom. Like the embodiments described, the rotation rate of the output shaft 278 can be varied by changing the orientation of the planetary gear 272 relative to the orbital plane which is perpendicular to the sun wheel axis and the planetary's 272 position regarding its axis of symmetry thereof. However, as is apparent upon consideration of FIG. 5, the full 180° range of orientations (relative to the illustrated orientation) is not achievable due to mechanical interference between planetary gear 272 and sun gear 276 or shaft 278 as the planetary gear 272 approaches the limital barriers of mechanical interference short of the 180° angular span as shown in phantom as wheel positions 280, 282, respectively.

Figure 6A:
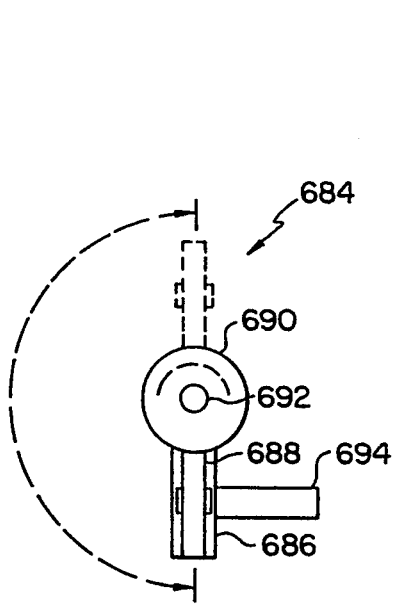
FIG. 6a is a front view of a planetary torque wheel assembly constructed in accordance with a further alternative embodiment of the present invention.
Figure 6B:
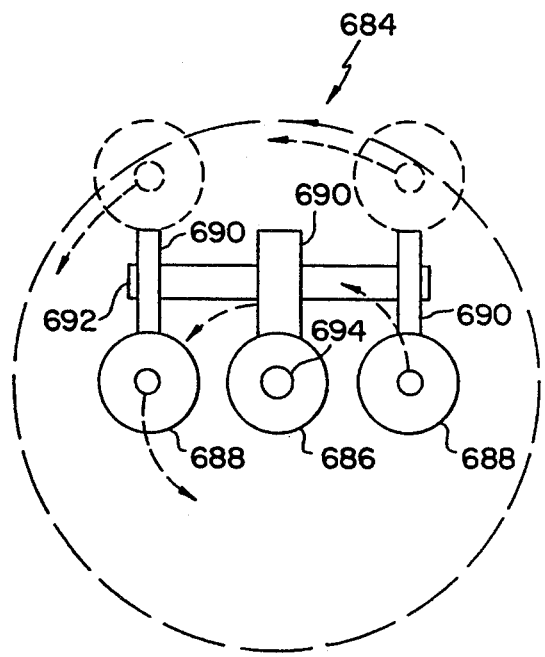

Referring to FIGS. 6a and 6b, front and side views, respectively, of an alternative planetary helical gear assembly 684 which eliminates the mechanical interference problem described just previously, are shown. The assembly 684 comprises zero-spin planetary gears 688, intermediary helical gears 690, intermediary gear shaft 692, and sun gear 686 mounted on output shaft 694. The planetary gears 688 are shown in the −90° orientation and, in phantom, in the 90° orientation. The intermediary gear shaft 692 allows the planetary gears 688 to be offset from the sun gear 686 so that the full 180° range of orientations can be achieved without mechanical interference. Thus, for a continuous input orbital cyclic rate of 1ω, an output rotation rate of shaft 694 anywhere in the range from 0ω–2ω can be achieved, assuming the helical gears 686, 688 and 690 have equal numbers of teeth. The output rotation rate range can be varied by changing the overall torque wheel ratio between gear 686 and gears 688 or by inclusion of a pair of spur gears of unequal pitch diameters, where the larger spur is integral with the output shaft 694, as but two such examples.

It is an advantage of the present invention that a transmission is provided wherein the transmission ratio can be infinitely varied within any required range utilizing only standard gear tooth design and without the need for slippage between driving and driven link members such as occur in friction, hydraulic and oscillatory rectification designs, to cite examples, in addition to providing neutral and reverse capabilities. In greater specificity concerning such advantageous properties or capabilities of the present invention, such a transmission is provided wherein an output rotation rate anywhere in the range of from 0ω to 2ω can be achieved for a constant input rotation rate of 1ω by changing orientation of a planetary gear relative to the orbital plane thereof. Yet a further advantage, and doubtless of great importance, is the economy and performance, in application to vehicles, with reductions in pollutants per passenger-mile for example. It will be appreciated that the overall transmission ratio range can be changed, e.g., from 0:2 to 0:.5, 0:4, 0:8, 0:11, etc., by interconnecting the output shaft to further torque wheel subassemblies, as already noted, interconnecting the input shaft to further torque wheel assemblies, or changing the torque wheel ratio between torque wheels. In brief, the present invention provides a transmission which allows infinite selections between reverse, neutral and forward (negative, zero, and positive) transmission ratios without the need for a clutch mechanism and with utilizing standard hardware components and mechanisms throughout. Further advantages will be apparent to those skilled in the art.

Although the present invention has been described with respect to specific embodiments thereof, various changes and modifications, in addition to those cited above, may be suggested to one skilled in the art and it is intended that the present invention encompass such changes and modifications as fall within the scope of the appended claims.

What is claimed is:

1. An apparatus for holding a first, orbital torque member rotationally fixed about an axis thereof while allowing the first member to orbit about an orbital axis, comprising:
   a first interconnecting assembly for interconnecting said first member to a second, longitudinal member, said second member being coaxial with said orbital axis, said first interconnecting assembly including a first longitudinal portion which is interconnected to said first and second members such that orbital motion of said first member about said orbital axis is coupled to radial reciprocating motion of said first longitudinal portion;
   a second interconnecting assembly for interconnecting said first member to said second member, said second interconnecting assembly including a second longitudinal portion which is interconnected to said first and second members such that orbital motion of said first member about said orbital axis is coupled to radial reciprocating motion of said second longitudinal portion; and
   means for rotatably interconnecting said first and second longitudinal portions of said first and second interconnecting assemblies so as to allow for relative reciprocating motion therebetween.

2. The apparatus of claim 1, wherein said longitudinal portion of each of said first and second interconnecting assemblies is interconnected to said first member by an eccentric bearing.

3. The apparatus of claim 1, wherein said longitudinal portion of each of said first and second interconnecting assemblies is interconnected to said first member by a crank.

4. The apparatus of claim 1, wherein said first and second interconnecting assemblies are interconnected to said first and second members such that said radial reciprocating motion of said first longitudinal portion is 90° out of phase with the radial reciprocating motion of said second longitudinal portion.

5. The apparatus of claim 1, further comprising means for interconnecting said first and second longitudinal portions for relative rotational motion therebetween.

6. An apparatus for holding at least one planetary torque wheel rotationally fixed about an axis thereof and allowing the planetary torque wheel to orbit about an orbital axis; comprising:
   first means moveable along an orbital radius of a first planetary torque wheel as said planetary torque wheel orbits about said orbital axis; and
   means for drivably interconnecting said planetary torque wheel and said first means so that periodic orbital motion of said planetary torque wheel is coupled with nonharmonic radially reciprocating motion of said first means.

7. The apparatus of claim 6, wherein said means for drivably interconnecting comprises a first crank arm for interconnecting said first means and said torque wheel and a second crank arm for interconnecting said first means and a fixed pivot means.

8. The apparatus of claim 6, wherein said first and second crank arms are interconnected so as to remain substantially parallel as said first planetary torque wheel orbits about said orbital axis.

9. The apparatus of claim 6, further comprising:
   second means moveable along an orbital radius of a second planetary torque wheel.

10. The apparatus of claim 9, wherein said first and second torque wheels are interconnected so that orbital radius of said first planetary torque wheel and said orbital radius of said second planetary torque wheel remain perpendicular as said first and second torque wheels orbit about said orbital axis.

* * * * *